(12) United States Patent
Stoppe et al.

(10) Patent No.: US 10,921,573 B2
(45) Date of Patent: Feb. 16, 2021

(54) DETERMINING THE ARRANGEMENT OF A SAMPLE OBJECT BY MEANS OF ANGLE-SELECTIVE ILLUMINATION

(71) Applicant: Carl Zeiss Microscopy GmbH, Jena (DE)

(72) Inventors: Lars Stoppe, Jena (DE); Thomas Ohrt, Golmsdorf (DE); Markus Sticker, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/465,016

(22) PCT Filed: Oct. 20, 2017

(86) PCT No.: PCT/EP2017/076892
§ 371 (c)(1),
(2) Date: May 29, 2019

(87) PCT Pub. No.: WO2018/099652
PCT Pub. Date: Jun. 7, 2018

(65) Prior Publication Data
US 2019/0285401 A1    Sep. 19, 2019

(30) Foreign Application Priority Data
Nov. 30, 2016   (DE) .................. 10 2016 123 154

(51) Int. Cl.
*G02B 21/24* (2006.01)
*G06T 7/73* (2017.01)
(Continued)

(52) U.S. Cl.
CPC .......... *G02B 21/241* (2013.01); *G01B 11/026* (2013.01); *G02B 21/06* (2013.01);
(Continued)

(58) Field of Classification Search
CPC ...................................................... G01B 11/14
See application file for complete search history.

(56) References Cited

U.S. PATENT DOCUMENTS 6,844,674 B2   1/2005  Chang et al.
2006/0263593 A1  11/2006  Aziz et al.
(Continued)

FOREIGN PATENT DOCUMENTS

| CN | 1866573 | 11/2006 | |
|---|---|---|---|
| CN | 102956824 | 3/2013 | |
| WO | WO-2013047111 A1 * | 4/2013 | ............... G02B 7/34 |

OTHER PUBLICATIONS

Chinese Office Action corresponding to Chinese Patent Application No. 201710103356.1, dated Mar. 5, 2019 (14 pages with English translation).

*Primary Examiner* — Michelle M Iacoletti
(74) *Attorney, Agent, or Firm* — Myers Bigel, P.A.

(57) ABSTRACT

A method for determining an arrangement of a sample object in an optical device comprises illuminating the sample object from at least one first illumination direction and illuminating the sample object from at least one second illumination direction. The method also comprises carrying out a correlation between data which are indicative of at least one section of an image of the sample object under illumination from the at least one first illumination direction and data which are indicative of at least one section of an image of the sample object under illumination from the at least one second illumination direction. The method also comprises determining the arrangement of the sample object in relation to a focal plane of the optical device based on the correlation.

19 Claims, 15 Drawing Sheets

(51) Int. Cl.
    *G02B 21/06*     (2006.01)
    *G01B 11/02*     (2006.01)
    *G02B 21/36*     (2006.01)
    *G01B 11/14*     (2006.01)
    *G01B 11/06*     (2006.01)

(52) U.S. Cl.
    CPC ......... G02B 21/245 (2013.01); G02B 21/367 (2013.01); G06T 7/74 (2017.01); *G01B 11/0608* (2013.01); *G01B 11/14* (2013.01); *G06T 2207/10056* (2013.01); *G06T 2207/10152* (2013.01); *G06T 2207/30024* (2013.01)

(56) References Cited

U.S. PATENT DOCUMENTS

| | | | |
|---|---|---|---|
| 2013/0048993 A1 | 2/2013 | Katsuhara et al. | |
| 2017/0223258 A1* | 8/2017 | Fukuda | H04N 5/23212 |
| 2018/0329194 A1* | 11/2018 | Small | G02B 7/36 |

\* cited by examiner

DETERMINING THE ARRANGEMENT OF A SAMPLE OBJECT BY MEANS OF ANGLE-SELECTIVE ILLUMINATION

CROSS REFERENCE TO RELATED APPLICATIONS

This application is a 35 U.S.C. § 371 national stage application of PCT International Application No. PCT/EP2017/076892, filed on Oct. 20, 2017, which claims priority from German Patent Application No. DE 102016123154.1, filed on Nov. 30, 2016, the contents of which are incorporated herein by reference in their entireties. The above-referenced PCT International Application was published in the German language as International Publication No. WO 2018/099652 A1 on Jun. 7, 2018.

TECHNICAL FIELD

Various examples of the invention relate generally to techniques for determining an arrangement of a sample object in an optical device by illuminating the sample object from different illumination directions. Various examples of the invention relate in particular to determining the arrangement by means of carrying out a correlation between data which correspond to the different illumination directions.

BACKGROUND

DE 10 2014 109 687 A1 discloses techniques for illuminating a sample object from different illumination directions (angle-selective illumination or structured illumination). Images obtained in this way can subsequently be digitally processed or analyzed. It is thereby possible to obtain additional information, for example the distance between the sample object and a focal plane of a corresponding optical device.

It has been observed that conventional techniques for digital postprocessing in the context of angle-selective illumination may have only a limited accuracy in specific situations. By way of example, it may happen that, in the case of sample objects which are arranged comparatively far away from the focal plane of the optical device, the digital postprocessing can be carried out only with a high inaccuracy.

BRIEF DESCRIPTION OF THE INVENTION

Therefore, there is a need for improved techniques for digital postprocessing in the context of angle-selective illumination. In particular, there is a need for such techniques which eliminate at least some of the disadvantages and limitations mentioned above.

This object is achieved by the features of the independent patent claims. The features of the dependent patent claims define embodiments.

In one example, a method for determining an arrangement of a sample object in an optical device comprises illuminating the sample object from at least one first illumination direction and illuminating the sample object from at least one second illumination direction. The method also comprises carrying out a correlation between data which are indicative of at least one section of an image of the sample object under illumination from the at least one first illumination direction and data which are indicative of at least one section of an image of the sample object under illumination from the at least one second illumination direction. The method also comprises determining the arrangement of the sample object in relation to a focal plane of the optical device on the basis of the correlation.

In a further example, a computer program product comprises program code which can be executed by at least one computing unit. Executing the program code has the effect that the at least one computing unit carries out a method for determining an arrangement of a sample object in an optical device. The method comprises illuminating the sample object from at least one first illumination direction and illuminating the sample object from at least one second illumination direction. The method also comprises carrying out a correlation between data which are indicative of at least one section of an image of the sample object under illumination from the at least one first illumination direction and data which are indicative of at least one section of an image of the sample object under illumination from the at least one second illumination direction. The method also comprises determining the arrangement of the sample object in relation to a focal plane of the optical device on the basis of the correlation.

In a further example, a computer program comprises program code which can be executed by at least one computing unit. Executing the program code has the effect that the at least one computing unit carries out a method for determining an arrangement of a sample object in an optical device. The method comprises illuminating the sample object from at least one first illumination direction and illuminating the sample object from at least one second illumination direction. The method also comprises carrying out a correlation between data which are indicative of at least one section of an image of the sample object under illumination from the at least one first illumination direction and data which are indicative of at least one section of an image of the sample object under illumination from the at least one second illumination direction. The method also comprises determining the arrangement of the sample object in relation to a focal plane of the optical device on the basis of the correlation.

In a further example, an optical device comprises at least one computing unit and also an illumination module having a multiplicity of light sources. The multiplicity of light sources defines a multiplicity of illumination directions. The optical device also comprises a sample holder configured to fix a sample object. The at least one computing unit is configured to drive the illumination module for illuminating the sample object from at least one first illumination direction and to drive the illumination module for illuminating the sample object from at least one second illumination direction. The at least one computing unit is furthermore configured to correlate a correlation between data which are indicative of at least one section of an image of the sample object under illumination from the at least one first illumination direction and data which are indicative of at least one section of an image of the sample object under illumination from the second illumination direction. The at least one computing unit is furthermore configured to determine an arrangement of the sample object in relation to a focal plane of the optical device on the basis of the correlation.

In one example, a method for determining an arrangement of a sample object in an optical device comprises illuminating the sample object from at least one first illumination direction and illuminating the sample object from at least one second illumination direction. The method also comprises carrying out a comparison between data which are indicative of at least one section of an image of the sample object under illumination from the at least one first illumination direction and data which are indicative of at least one section of an image of the sample object under illumination from the at least one second illumination direction. The method also comprises determining the arrangement of the sample object in relation to a focal plane of the optical device on the basis of the comparison.

In a further example, a computer program product comprises program code which can be executed by at least one computing unit. Executing the program code has the effect that the at least one computing unit carries out a method for determining an arrangement of a sample object in an optical device. The method comprises illuminating the sample object from at least one first illumination direction and illuminating the sample object from at least one second illumination direction. The method also comprises carrying out a comparison between data which are indicative of at least one section of an image of the sample object under illumination from the at least one first illumination direction and data which are indicative of at least one section of an image of the sample object under illumination from the at least one second illumination direction. The method also comprises determining the arrangement of the sample object in relation to a focal plane of the optical device on the basis of the comparison.

In a further example, a computer program comprises program code which can be executed by at least one computing unit. Executing the program code has the effect that the at least one computing unit carries out a method for determining an arrangement of a sample object in an optical device. The method comprises illuminating the sample object from at least one first illumination direction and illuminating the sample object from at least one second illumination direction. The method also comprises carrying out a comparison between data which are indicative of at least one section of an image of the sample object under illumination from the at least one first illumination direction and data which are indicative of at least one section of an image of the sample object under illumination from the at least one second illumination direction. The method also comprises determining the arrangement of the sample object in relation to a focal plane of the optical device on the basis of the comparison.

In a further example, an optical device comprises at least one computing unit and also an illumination module having a multiplicity of light sources. The multiplicity of light sources defines a multiplicity of illumination directions. The optical device also comprises a sample holder configured to fix a sample object. The at least one computing unit is configured to drive the illumination module for illuminating the sample object from at least one first illumination direction and to drive the illumination module for illuminating the sample object from at least one second illumination direction. The at least one computing unit is furthermore configured to correlate a comparison between data which are indicative of at least one section of an image of the sample object under illumination from the at least one first illumination direction and data which are indicative of at least one section of an image of the sample object under illumination from the second illumination direction. The at least one computing unit is furthermore configured to determine an arrangement of the sample object in relation to a focal plane of the optical device on the basis of the comparison.

By way of example, it would be possible to determine, on the basis of the comparison and in particular the correlation, a distance between an imaging of the sample object under illumination from the at least one first illumination direction and an imaging of the sample object under illumination from the at least one second illumination direction. The arrangement can then be determined on the basis of this distance.

For example, the arrangement can denote a position of the sample object in relation to the focal plane, i.e. for example a distance between the sample object and the focal plane. It would also be possible for the arrangement to denote an extent of the sample object in relation to the focal plane, i.e. an extent parallel to the principal optical axis of the optical device.

The features set out above and features that are described below may be used not only in the corresponding combinations explicitly set out, but also in further combinations or in isolation, without departing from the scope of protection of the present invention.

BRIEF DESCRIPTION OF THE FIGURES

The properties, features and advantages of this invention described above and the way in which they are achieved will become clearer and more clearly comprehensible in association with the following description of the exemplary embodiments which are explained in greater detail in association with the drawings.

DETAILED DESCRIPTION OF EMBODIMENTS

Figure 1:
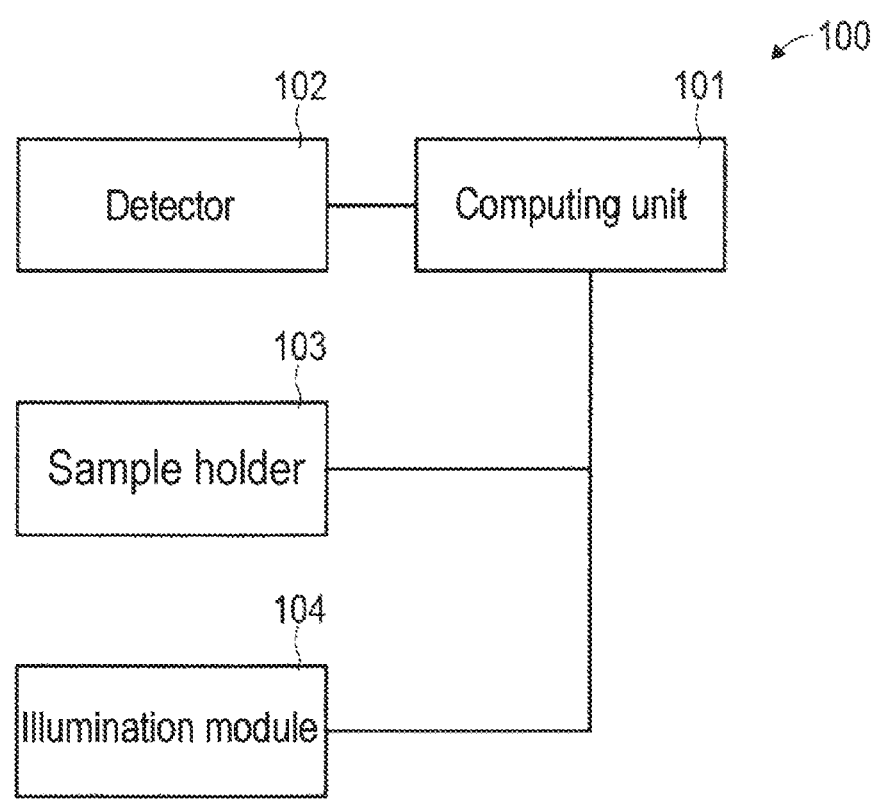
FIG. 1 is a schematic illustration of an optical device in accordance with various examples comprising a computing unit, an illumination module and a sample holder.

The present invention is explained in greater detail below on the basis of preferred embodiments with reference to the drawings. In the figures, identical reference signs designate identical or similar elements. The figures are schematic representations of different embodiments of the invention. Elements illustrated in the figures are not necessarily depicted as true to scale. Rather, the different elements illustrated in the figures are reproduced in such a way that their function and general purpose become comprehensible to the person skilled in the art.

Various techniques in relation to angle-selective illumination are described below. Angle-selective illumination is sometimes also referred to as angle-resolved illumination. In the case of angle-selective illumination, a sample object is illuminated from a plurality of illumination directions; therefore, an angularly structured illumination is thus effected. The imaging of the sample object changes as a result. By way of example, a location of the imaging can vary. This can be utilized in the context of digital postprocessing in order to obtain additional information about the sample object. In particular, it is possible to ascertain a distance between imagings of the sample object which correspond to different illumination directions.

One example of digital postprocessing relates to determining the arrangement of the sample object in relation to an optical device that carries out the angle-selective illumination. In this case, the arrangement of the sample object may denote for example the position of the sample object in relation to the focal plane, i.e. a distance between the sample object and the focal plane. The position might be relative to a midpoint of the sample object, for example. By way of example, the position can be defined along a direction that is parallel to the principal optical axis of the optical device; this direction is typically referred to as the Z-direction. As an alternative or in addition to the position of the sample object, the arrangement of the sample object may for example also denote the extent of the sample object parallel to the Z-direction. By way of example, sample objects that have three-dimensional bodies and may therefore also have a significant extent along the Z-direction are frequently examined in the field of biotechnology.

By means of the techniques described herein, the arrangement of the sample can be determined particularly rapidly, for example without the need to carry out an imaging individually for a multiplicity of layers. This can limit a light-toxic effect and enable fast focusing. Moreover, the techniques described herein can make it possible to determine the arrangement of the sample particularly accurately.

The techniques of angle-selective illumination described herein can be combined with different applications. The applications can benefit from the determined arrangement of the sample. In this case, the applications can correlate with the type of optical device used. By way of example, the optical device could implement a conventional light microscope. The light microscope could have a sample holder configured to fix the sample object in the principal optical axis. By way of example, the light microscope could have a motorized sample holder, i.e. for example an electric motor configured to displace the sample holder. In particular, an autofocus application in which the sample holder is displaced along the Z-direction could be made possible as a result. The position of the sample object in relation to the focal plane, such as is obtained from the digital postprocessing in the context of angle-selective illumination, could then be used as input into the autofocus application.

In a further example, the focus adjusting distance made available to a user could be limited depending on the determined arrangement of the sample object. For this purpose, a user interface could be driven in a suitable manner.

In a further example, the optical device could implement a laser scanning microscope. Fluorescence imaging can be made possible in this way. One example of a specific application of fluorescence imaging is layer-resolved measurements, which involve capturing images for a plurality of layers of a sample object. One example is so-called light sheet microscopy, wherein a plurality of well-defined layers of the sample object can be individually excited to fluorescence. See, for example, DE 20 2013 012 338 U1. In this case, in association with digital postprocessing in the context of angle-selective illumination, it may be possible to determine the number and/or the positions of the layers on the basis of the determined position and extent of the sample object in relation to the focal plane.

In a further application, long-term measurements can be stabilized, wherein the long-term measurements have a measurement duration during which the shape and/or extent of the sample object change(s). By way of example, this would be the case for time-lapse measurements. By way of example, this may be the case for mobile samples in a 3D matrix.

By way of example, individual sample constituents, such as individual cells, for example, could have a high mobility. Moreover, drifts, for example on account of temperature fluctuations or external vibrations, can be compensated for as a result.

For many applications which are made possible by digital postprocessing in the context of angle-selective illumination—such as, for example, the autofocus application mentioned above and the light sheet microscopy application mentioned above—it may be worthwhile for the arrangement of the sample object in relation to the focal plane to be known with a particularly high accuracy. A description is given below of techniques in relation to digital postprocessing in the context of angle-selective illumination which make it possible to determine the arrangement of the sample object in relation to the focal plane with a particularly high accuracy.

In various examples, this objective is achieved by virtue of the fact that one or more images corresponding to different illumination directions of the sample object are compared with one another by means of a correlation.

The correlation can make it possible to quantify a relationship between imagings of the sample object from different illumination directions. In particular, by means of the correlation it may be possible to determine distances or displacements between the imagings of the sample object from different illumination directions. By way of example, by means of the correlation it might be possible to identify that translational displacement which converts a first imaging of the sample object for a first illumination direction into a second imaging of the sample object for a second illumination direction.

In some examples, the first imaging of the sample object for the first illumination direction could be associated with a first image and the second imaging of the sample object for the second illumination direction could be associated with a further, second image. In such a case, an exemplary implementation of the correlation would emerge from the following equation:

$$K(T) = \Sigma_n x(n) y(n+T). \quad (1)$$

In this case, it is possible to determine the value of the correlation for different displacements T between the first image x and the second image y. A maximum of the correlation denotes that $T \equiv T_0$ for which the first image and the correspondingly displaced second image have a particularly high similarity. Therefore, $T_0$ is indicative of the distance between the imagings of the sample object from different illumination directions. n indexes the pixels. Equation 1 describes a one-dimensional correlation in a simplified manner, wherein generally a two-dimensional correlation could also be carried out. Since different images are compared, this type of correlation is sometimes also referred to as a cross-correlation.

The position of the maximum of the correlation can subsequently be used to determine the arrangement of the sample object in relation to the focal plane. By way of example, the distance between the sample object and the focal plane could be obtained by means of the following equation:

$$\Delta z = T \frac{\cos\alpha \cdot \cos\beta}{\sin(\alpha + \beta)}, \quad (2)$$

wherein $\alpha$ and $\beta$ respectively denote the angles between the illumination directions and the principal optical axis. The principles of corresponding techniques are known from DE 10 2014 109 687 A1, the corresponding disclosure of which is incorporated herein by cross-reference.

In this case, Equation 2 merely denotes one exemplary implementation of a corresponding calculation. Other formulations of Equation 2 could also be used, for example:

$$\Delta z = T \frac{\Delta IO}{\Delta L + T}, \quad (3)$$

wherein $\Delta/O$ denotes the distance between the light sources used for generating the illumination directions and the focal plane and wherein $\Delta L$ denotes the distance between the light sources used.

As an alternative or in addition to the position of the maximum of the correlation, other characteristics of the correlation could also be used for determining the arrangement of the sample object in relation to the focal plane. One example comprises the width of the maximum of the correlation. As a result, it would be possible, for example, to deduce the extent of the sample object in relation to the focal plane—by an appropriate application of Equation 2.

Such techniques described above are particularly flexible and can be adapted depending on the desired implementation. In a first example, a single image could be recorded, wherein two different illumination directions are activated in parallel in time domain in this case. In this first example, the correlation may also be referred to as an autocorrelation. In this case, a distance between maxima of the autocorrelation corresponds to the distance between the sample object and the focal plane. By way of example, the position of a maximum of the autocorrelation relative to zero could also be considered. In a second example, a single image could be recorded, wherein three different illumination directions are activated in this case. An autocorrelation could once again be used, wherein the maximum of the autocorrelation corresponds to the distance between the sample object and the focal plane. In a third example, a plurality of images could be recorded for example sequentially in time domain or at different frequencies, wherein each image respectively includes an imaging of the sample object from a single illumination direction. In such an example, the correlation may be referred to as a cross-correlation. The maximum of the correlation once again corresponds to the distance between the sample object and the focal plane.

In such examples described above and also in further examples described herein it may be possible to carry out a two-dimensional correlation. The evaluation could then take into account in particular that direction which is oriented along a connecting line between the different illumination directions used. In other examples, it would also be possible to carry out directly a one-dimensional correlation along this direction.

In some examples, it would be possible for the at least one image which includes the imagings of the sample object from different illumination directions to be preconditioned before the correlation is applied. By way of example, in one example individual sections could be extracted from the at least one image, such that the correlation is applied only to a part of the at least one image. By way of example, a spatially resolved correlation for different sections of the at least one image could be obtained in this way. A topography of the sample object that is spatially resolved in lateral directions, a so-called z-map, can be determined as a result. In further examples, it would be possible for an average of the values of the different pixels of the at least one image to be subtracted from the values of the different pixels before the correlation is carried out; in other words, it would be possible for the correlation to be applied to a contrast image of the at least one image. In the case of the contrast image, the absolute value of the image rectified of any offset could then also be generated. In even further examples, the values of the different pixels in a direction perpendicular to the connecting axis between the different illumination directions could be combined—e.g. added—; in this case, by means of a single one-dimensional correlation, it is possible to determine the distance between the imagings of the sample object for the different illumination directions.

In general, different techniques for preconditioning can be combined. It would therefore be possible in general to carry out a correlation between data which are indicative of at least one section of an image of the sample object under illumination from the at least one first illumination direction and data which are indicative of at least one section of an image of the sample object under illumination from the at least one second illumination direction.

FIG. 1 illustrates aspects in relation to an optical device 100. By way of example, the optical device 100 could implement a light microscope or a laser scanning microscope. By way of example, the optical device 100 could be configured to carry out fluorescence imaging and/or light sheet imaging.

The optical device 100 comprises an illumination module 104. The illumination module 104 can have a multiplicity of light sources. The various light sources from the multiplicity of light sources can be arranged at a distance from one another, such that different illumination directions in relation to a sample object can be achieved. Individual light sources can be individually switchable. The various light sources can emit light having identical or different wavelengths.

The sample object can be fixed on a sample holder 103. In this case, it would be possible for the sample holder to be motorized and to be able to be electrically adjusted. In particular, a focusing of the sample object can be achieved by the adjustment of the sample holder. This can be carried out automatically (autofocus). However, the sample holder 103 could also be manually adjustable.

The optical device 100 also comprises a detector 102. By way of example, the detector 102 could be a camera. By way of example, the detector 102 could comprise a CCD sensor or a CMOS sensor having a plurality of pixels. The detector 102 could have a sensitivity in the infrared range.

The illumination module 104 can be used in particular for the angle-selective illumination from the different illumination directions. It would optionally be possible for the illumination module 104 also to be used for conventional imaging. In other examples, however, it would also be possible for the optical device 101 to comprise a further illumination module (not illustrated in FIG. 1) used in association with conventional imaging. For conventional imaging, a further detector could also be present (not illustrated in FIG. 1).

In the example in FIG. 1, the illumination module 104 and the detector 102 are arranged on different sides of the sample holder 103. In other examples, it would also be possible for the illumination module 104 and the detector 102 to be arranged on the same side of the sample holder 103.

The optical device 100 also comprises a computing unit 101. By way of example, the computing unit 101 could be implemented as a microprocessor or processor. The computing unit 101 could also be implemented as a field programmable array (FPGA) or an application specific integrated circuit (ASIC).

The computing unit 101 is configured to implement control functionality in relation to the illumination module 104, the sample holder 103 and the detector 102. By way of example, the computing unit 101 could be configured to transmit control signals to the illumination module 104, wherein the control signals are indicative of one or more light sources from the multiplicity of light sources of the illumination module 104 which are intended to be switched on. The computing unit 101 could be configured, for example, to transmit control signals to the sample holder 103, wherein the control signals are indicative of an adjustment of the sample holder 103—for example parallel to the Z-direction. The computing unit 101 could be configured, for example, to transmit control signals to the detector 102, wherein the control signals are indicative of an exposure time with which the detector 102 is intended to capture one or more images. The control signals could alternatively or additionally also be indicative of other image parameters of the images to be captured.

The computing unit 101 could furthermore be configured to receive digital images from detector 102. The computing unit 101 could then be configured for digital postprocessing of the images. By way of example, the computing unit 101 could generate contrast images, by subtracting the average of the values of the different pixels. The computing unit 101 could also add the values of the pixels along different directions of the images. The computing unit 101 could also carry out a cross-correlation between a plurality of images or an autocorrelation for a single image.

The computing unit 101 could also implement various applications, such as, for example, an autofocus application or a light sheet microscopy application.

Figure 2:
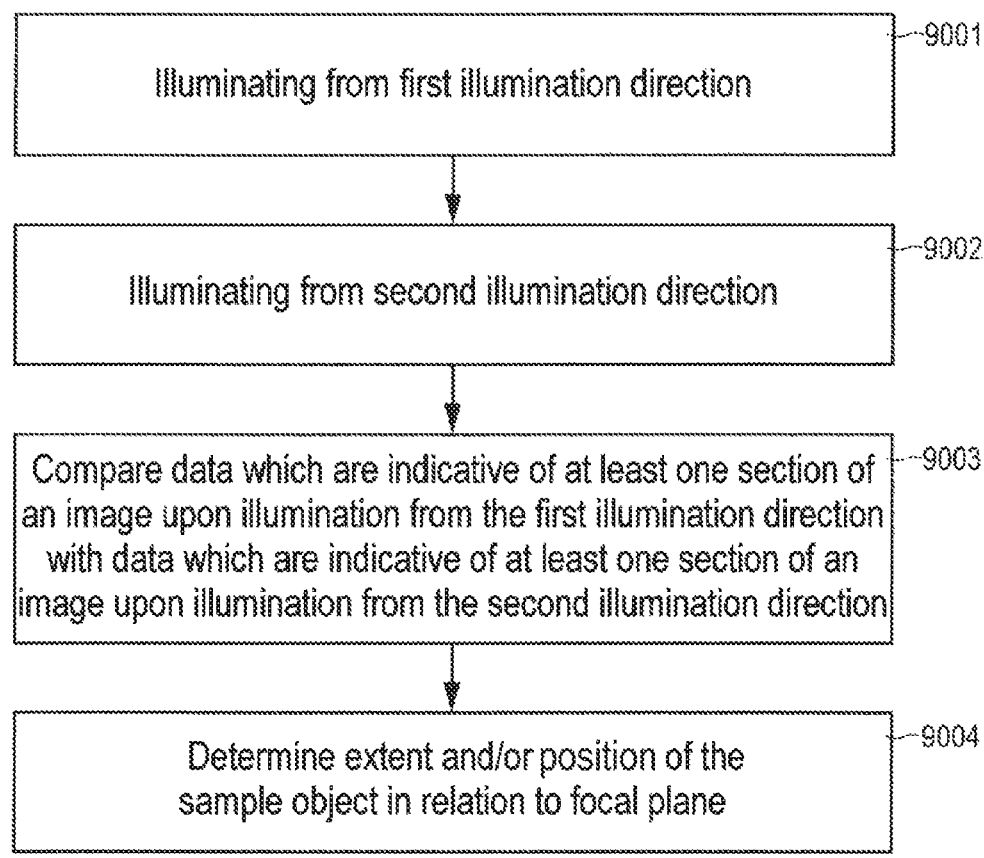
FIG. 2 is a flow diagram of one exemplary method for determining the arrangement of a sample object in relation to a focal plane.

FIG. 2 is a flow diagram of one exemplary method. By way of example, the method could be carried out by the computing unit 101 of the optical device 100. The method in accordance with the example in FIG. 2 could be carried out for example in a manner embedded into a long-term measurement; in this context, the method in accordance with FIG. 2 could also be referred to as a navigator measurement since it is thereby possible to determine the arrangement of the sample object, which may in turn be helpful for the configuration of the long-term measurement.

Firstly, step 9001 involves illuminating a sample object from at least one first illumination direction. By way of example, a first pattern of illumination directions could be used for illuminating the sample object in step 9001.

Step 9002 involves illuminating the sample object from at least one second illumination direction, which is different than the at least one first illumination direction from step 9001. By way of example, a second pattern of illumination directions, which is different than the first pattern, could be used for illuminating the sample object in step 9002.

Since illumination directions having an oblique angle of incidence can be used in principle, the techniques described herein can also be used for phase objects. The latter have a sufficient contrast even at an oblique angle of incidence. However, it is also possible for the techniques described herein to be used for amplitude objects.

In some examples, it would be possible for steps 9001 and 9002 to be carried out sequentially in time domain; in that case, a first image of the sample object can be obtained for step 9001 and a separate, second image of the sample object can be obtained for step 9002.

In other examples, however, it would also be possible for steps 9001 and 9002 to be carried out in parallel in time domain; in that case, a common image of the sample object can be obtained for steps 9001 and 9002, said common image imaging the sample object in a superimposed manner both under illumination from the at least one first illumination direction and under illumination from the at least one second illumination direction.

In various examples, it would be possible for the wavelength of the light for the at least one first illumination direction to be equal to the wavelength of the light for the at least one second illumination direction. However, it would also be possible for the light wavelength used for the at least one first illumination direction to be different than that used for the at least one second illumination direction.

In some examples, it would be possible for the sample object to be defocused before illuminating the sample object from the at least one first illumination direction in step 9001 and/or before illuminating the sample object from the at least one second illumination direction in step 9002. This can be done for example on the basis of a priori knowledge about a distance between the sample object and a focal plane of the optical device. The effect in respect of physical optics can be reduced as a result. The error introduced by the defocusing can subsequently be compensated for computationally.

In some examples, it would be possible for a suitable stop for the detector 102 to be chosen before illuminating the sample object from the at least one first illumination direction in step 9001 and/or before illuminating the sample object from the at least one second illumination direction in step 9002. The depth of field can be influenced as a result. A long-term measurement possibly carried out in parallel can be momentarily interrupted, under certain circumstances, by selectively changing the stop used, but otherwise can be carried out without restriction with the corresponding desired stop. By way of example, for steps 9001, 9002, an auxiliary optical unit having a particularly small stop with a large depth of field could be used for the detector 102. A long-term measurement could then use a different, larger stop. In general, it would also be possible to implement different detectors for illuminating the sample object in steps 9001, 9002, on the one hand, and a long-term measurement, on the other hand. These detectors could be mounted for example on opposite sides of the sample holder 103, or alternatively on the same side of the sample holder 103. By way of example, it would be possible for these detectors to have a different stop. By way of example, it would also be possible for these detectors to have a different magnification. By way of example, it would be possible for the detector 102 used in steps 9001, 9002 to have a comparatively low magnification. In this way, the focus position of the sample object can be determined even if the latter is arranged in a comparatively defocused manner.

Step 9003 involves comparing data which are indicative of at least one section of an image upon illumination from the at least one first illumination direction with data which are indicative of at least one section of an image upon illumination from the at least one second illumination direction.

In one simple example, the data could be identical to the image or images captured in steps 9001 and 9002. However, in other examples it would also be possible to carry out a preconditioning of the image or images captured in steps 9001 and 9002, and thereby to obtain the data from step 9003. The preconditioning could comprise for example determining a contrast image. The preconditioning could comprise for example extracting one section or a plurality of sections from the image or images from steps 9001 and 9002. Determining the arrangement and for example the subsequent application, e.g. a focus tracking application, can then be restricted to specific regions of an extensive sample object or one or a plurality of sample objects from a multiplicity of sample objects or be carried out in a spatially resolved manner laterally. A spatially resolved topography of the sample object can be determined as a result. The preconditioning could comprise for example a combination of a plurality of values of pixels of the image or images from steps 9001 and 9002. The preconditioning could also concern other techniques of image processing, for example a deconvolution.

One exemplary implementation of the comparison from step 9003 comprises a correlation between the data which are indicative of the at least one section of the image of the sample object under illumination from the at least one first illumination direction and the data which are indicative of the at least one section of the image of the sample object under illumination from the at least one second illumination direction. The correlation can enable particularly accurate comparison and can yield reliable results, even if the sample object is arranged in a comparatively defocused manner.

In this case, it would be possible, for example, for the correlation to be implemented as an autocorrelation. An autocorrelation could be used for example if illuminating from the at least one first illumination direction in step 9001 and illuminating from the at least one second illumination direction in step 9002 are carried out in parallel in time domain and a single image is obtained; one and the same data can then be indicative of the at least one section of the image of the sample object under illumination from the at least one first illumination direction and of the at least one section of the image of the sample object under illumination from the at least one second illumination direction. Such a technique makes it possible for illuminating the sample object from the at least one first illumination direction and from the at least one second illumination direction to be carried out particularly rapidly. However, it would also be possible for the correlation to be implemented as a cross-correlation between different data. A cross-correlation could be used for example if illuminating from the at least one first illumination direction in step 9001 and illuminating from the at least one second illumination direction in step 9002 are carried out sequentially in time domain and two separate images are obtained as a result; different data could then be indicative of the at least one section of the image of the sample object under illumination from the at least one first illumination direction and respectively indicative of the at least one section of the image of the sample object under illumination from the at least one second illumination direction. Such a technique makes it possible to determine the arrangement of the sample object in relation to the focal plane of the optical device particularly accurately.

Step 9004 subsequently involves determining the extent and/or the position of the sample object—that is to say generally the arrangement of the sample object—in relation to the focal plane. Techniques such as have been described above in relation to equations 2 and 3 can be used for this purpose.

Proceeding from the determined arrangement of the sample object, various applications can then be implemented, such as, for example, an autofocus application or a light sheet microscopy application (not illustrated in FIG. 2).

Figure 3:
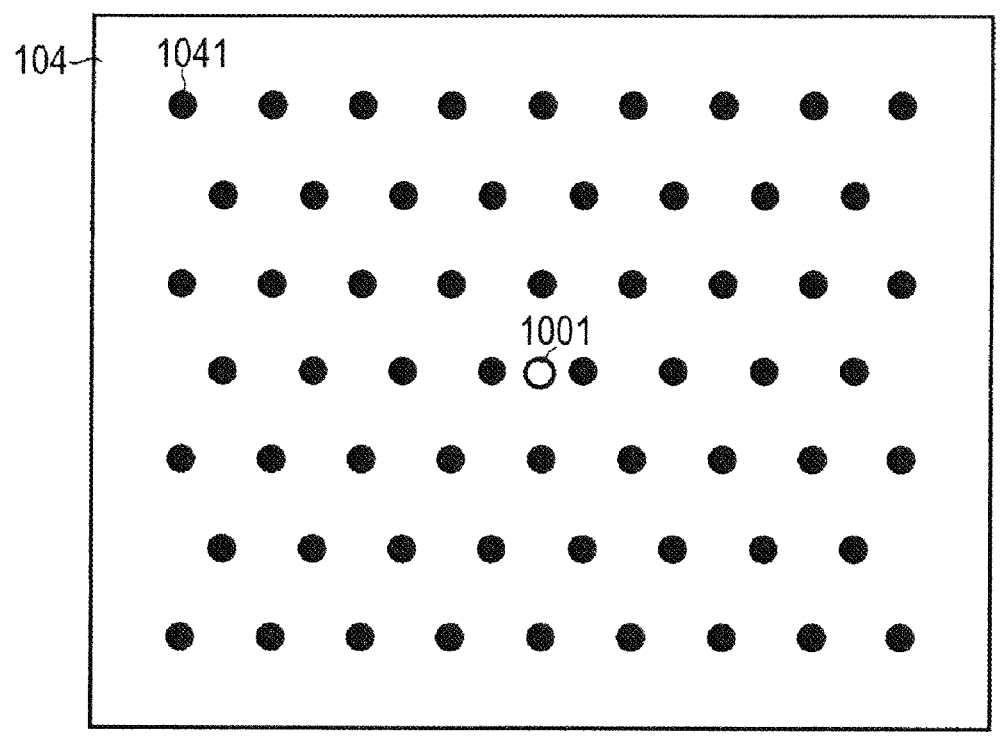
FIG. 3 is a schematic illustration of an illumination module in accordance with various examples.

FIG. 3 illustrates aspects in relation to the illumination module 104. The illumination module 104 comprises a multiplicity of light sources 1041. By way of example, the light sources 1041 could be implemented as light-emitting diodes. However, other types of luminaires would also be possible for implementing the light sources.

In the example in FIG. 3, the light sources 1041 are arranged in a lattice structure on a carrier. Different lattice structures having different unit cells are possible. However, the light sources 1041 need not necessarily be arranged in a lattice structure; by way of example, ring-shaped arrangements would also be possible.

FIG. 3 furthermore illustrates that the light sources 1041 are arranged symmetrically in relation to the principal optical axis 1001 of the optical device 100. That is optional.

The different light sources 1041 can be driven separately. This means that individual light sources 1041 can be switched on, while other light sources 1041 remain switched off. By way of example, the computing unit 101 could be configured to transmit corresponding control data to the illumination module 104 which address the different light sources 1041.

Figure 4:
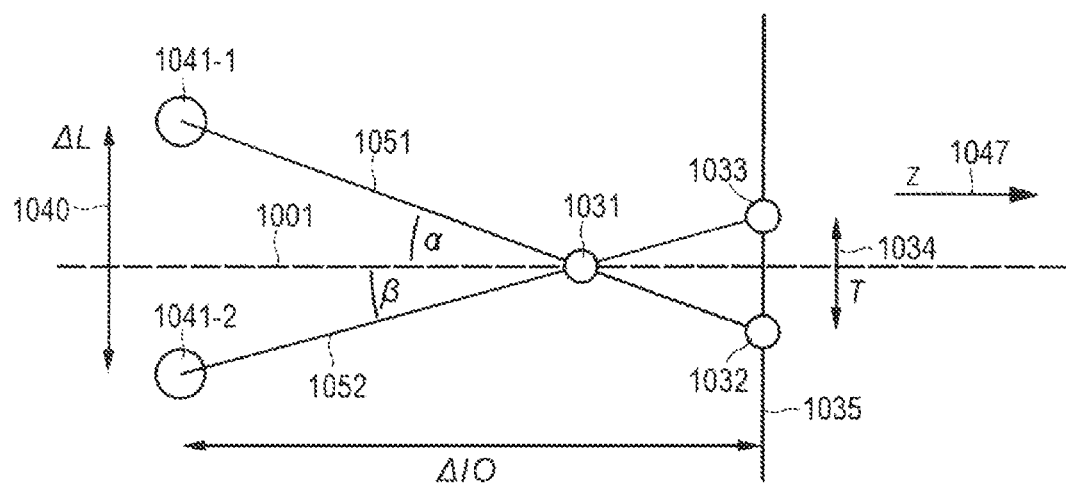
FIG. 4 schematically illustrates illuminating a sample object from different illumination directions in accordance with various examples.

FIG. 4 illustrates aspects in relation to different illumination directions 1051, 1052. FIG. 4 illustrates the illumination of a sample object 1031 from the illumination direction 1051; in this case, the illumination direction 1051 is associated with the light source 1041-1. Illumination of the sample object 1031 from the illumination direction 1051 results in an imaging 1033 of the sample object 1031 in the focal plane 1035. Correspondingly, illumination of the sample object 1031 from the illumination direction 1052—which is associated with the light source 1041-2—results in an imaging 1032 of the sample object 1031 in the focal plane 1035. It is evident from FIG. 4 that the imagings 1032, 1033 are displaced relative to one another by a distance 1034 (designated by T; cf. Equations 2 and 3). The distance 1034 can be ascertained particularly accurately by means of the correlation.

FIG. 4 furthermore depicts various variables from Equations 2 and 3. By way of example, FIG. 4 illustrates the distance 1040, ΔL between the light sources 1041-1, 1041-2; the distance 1040 can also serve as a measure of the distance between the illumination directions 1051, 1052. The angles α, β formed between the illumination directions and the principal optical axis 1001 (which is oriented along the z-direction 1047) of the optical device 100, or generally the angle between the illumination directions, could serve as a further measure of the distance between the illumination directions 1051, 1052.

Figure 5:
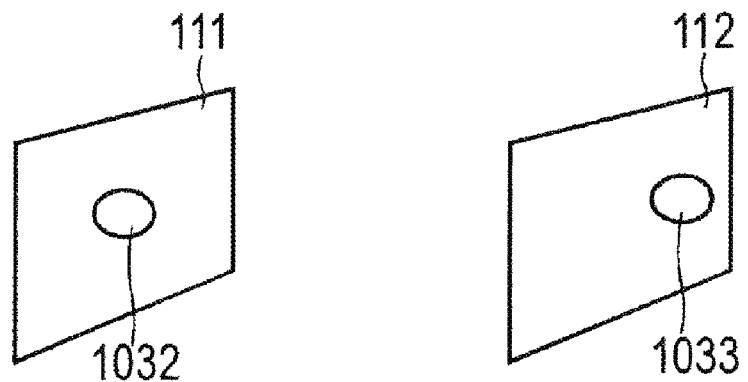
FIG. 5 schematically illustrates a plurality of images of the sample object, wherein different images in accordance with various examples include an imaging of the sample object under illumination from different illumination directions.

FIG. 5 illustrates aspects in relation to images 111, 112 of the sample object 1031. In this case, the image 111 includes the imaging 1032 of the sample object under illumination from the illumination direction 1051. In this case, the image 112 includes the imaging 1033 of the sample object 1031 under illumination from the illumination direction 1052. It is evident from FIG. 5 that the positions of the imagings 1032, 1033 are displaced relative to one another by the distance 1034.

By way of example, both images 111, 112 could be compared with one another in order to ascertain said distance 1034. A cross-correlation between the images 111, 112 could be applied for this purpose.

Figure 6:
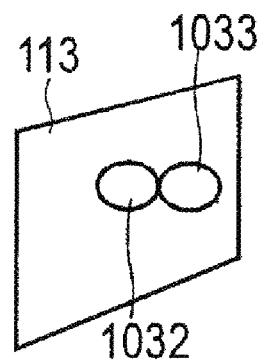
FIG. 6 schematically illustrates a single image of the sample object, wherein this image in accordance with various examples includes a plurality of imagings of the sample object under illumination from different illumination directions.

FIG. 6 illustrates aspects in relation to an image 113 of the sample object 1031. In this case, the image 113 includes both the imaging 1032 of the sample object 1031 under illumination from the illumination direction 1051 and the imaging 1033 of the sample object 1031 under illumination from the illumination direction 1052. It is evident from FIG. 6 in turn that the positions of the imagings 1032, 1033 are displaced relative to one another by the distance 1034.

By way of example, the image 113 could be analyzed in order to ascertain said distance 1034. An autocorrelation could be applied to the image 113 for this purpose.

With regard to FIGS. 4-6, examples have been discussed in which the sample object 1031 is illuminated from a single illumination direction 1051, 1052 per analyzed imaging 1032, 1033. In some implementations, however, it might be worthwhile to compare the imaging 1032 of the sample object 1031 upon illumination from a first multiplicity of illumination directions in accordance with a first pattern with the imaging 1033 of the sample object 1031 upon illumination from a second multiplicity of illumination directions in accordance with a second pattern. Specifically, what can be achieved thereby is that more light per analyzed imaging illuminates the sample object 1031. As a result, it is possible to determine the arrangement of the sample object 1031 on the basis of one or more images with a particularly high signal-to-noise ratio, such that the arrangement of the sample object 1031 can be ascertained particularly accurately.

Figure 7:
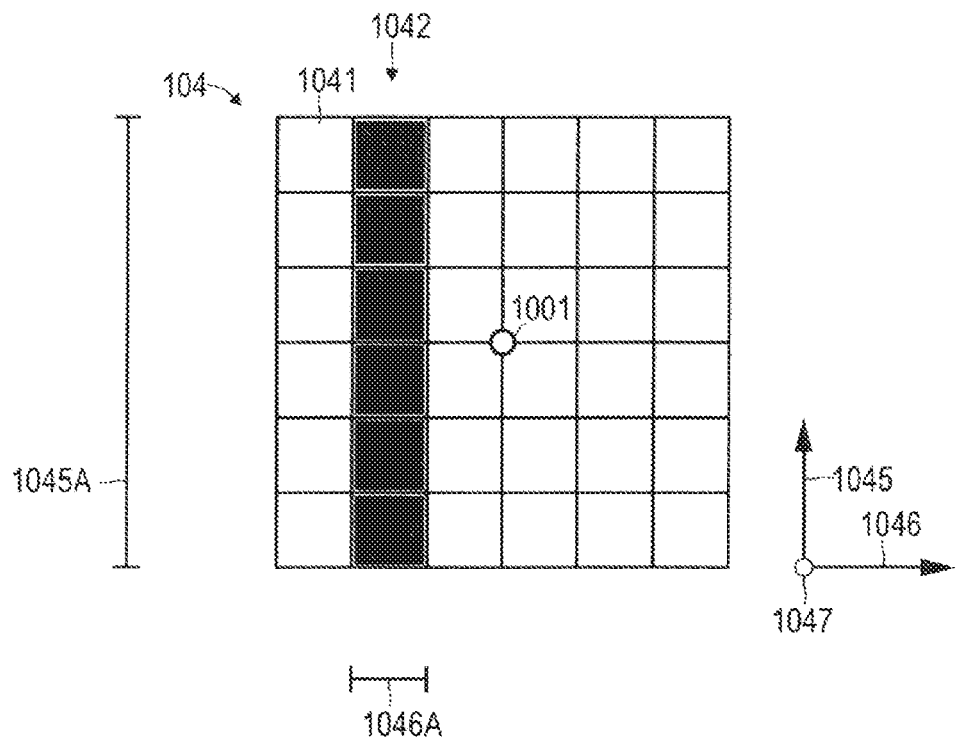
FIG. 7 schematically illustrates a pattern including a plurality of illumination directions in accordance with various examples.

FIG. 7 illustrates aspects in relation to the illumination module 104. In particular, FIG. 7 illustrates a multiplicity of light sources 1041 of the illumination module 104, which are activated in accordance with an exemplary pattern 1042 for illuminating the sample object 1031.

In the example in FIG. 7, the pattern 1042 corresponds to a line pattern. This means that in the case of a lattice-shaped arrangement of the light sources 1041, for example, all the light sources 1041 in one column of the lattice are switched on. In other words, adjacent illumination directions of the pattern 1042 are not at a distance along the direction 1046, but rather only along the direction 1045.

In general, so-called thin patterns could be used. A thin pattern may be characterized by the fact that in the direction 1045 it has an extent 1045A that is significantly greater than the extent 1046A in the direction 1046 perpendicular thereto, e.g. more than two times the magnitude thereof, optionally more than five times the magnitude thereof, further optionally more than twenty times the magnitude thereof. By way of example, in the case of an array of light sources 1041 along the direction 1045, a greater number of light sources 1041 of the illumination module 104 could be used along the direction 1045 than along the direction 1046, e.g. more than two times the number of light sources, optionally more than five times the number of light sources, further optionally more than twenty times the number of light sources.

Figure 8:
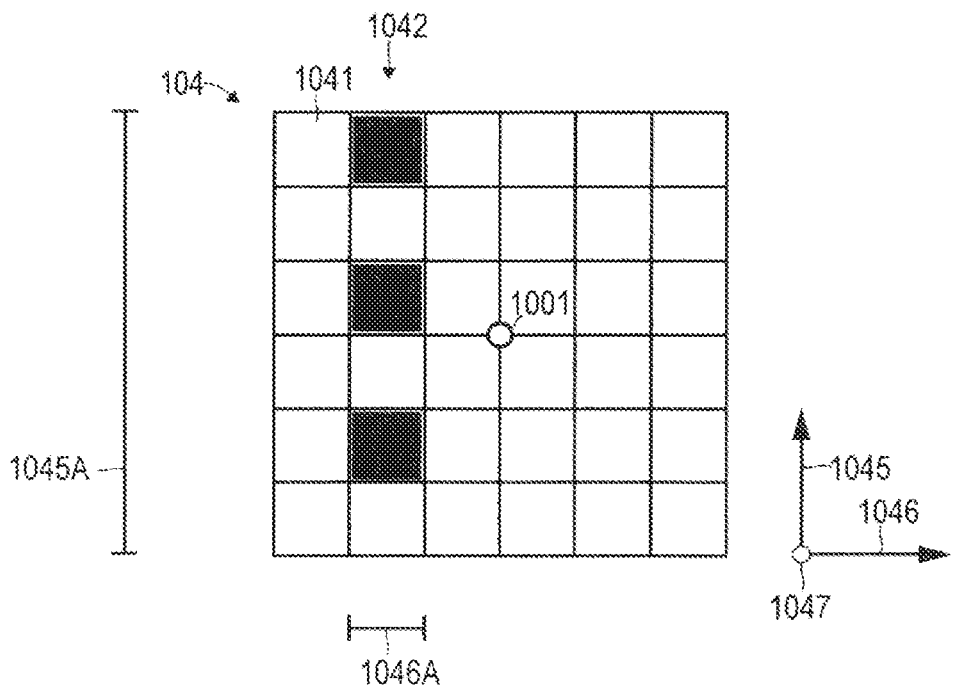
FIG. 8 schematically illustrates a pattern including a plurality of illumination directions in accordance with various examples.

FIG. 8 also illustrates aspects in relation to the illumination module 104. In particular, FIG. 8 also illustrates a multiplicity of light sources 1041 of the illumination module 104, which are activated in accordance with a further exemplary pattern 1042 for illuminating the sample object 1031.

The example in FIG. 8 corresponds, in principle, to the example in FIG. 7. In this case, in the example in FIG. 8, however, not all the light sources 1041 of a specific column are activated.

Both in the example in FIG. 7 and in the example in FIG. 8, patterns 1042 are used which only have an extent along the lateral direction 1045, but do not have an extent along the lateral direction 1046. This means that one-dimensional patterns 1042 are used for illuminating the sample object 1031.

Figure 9:
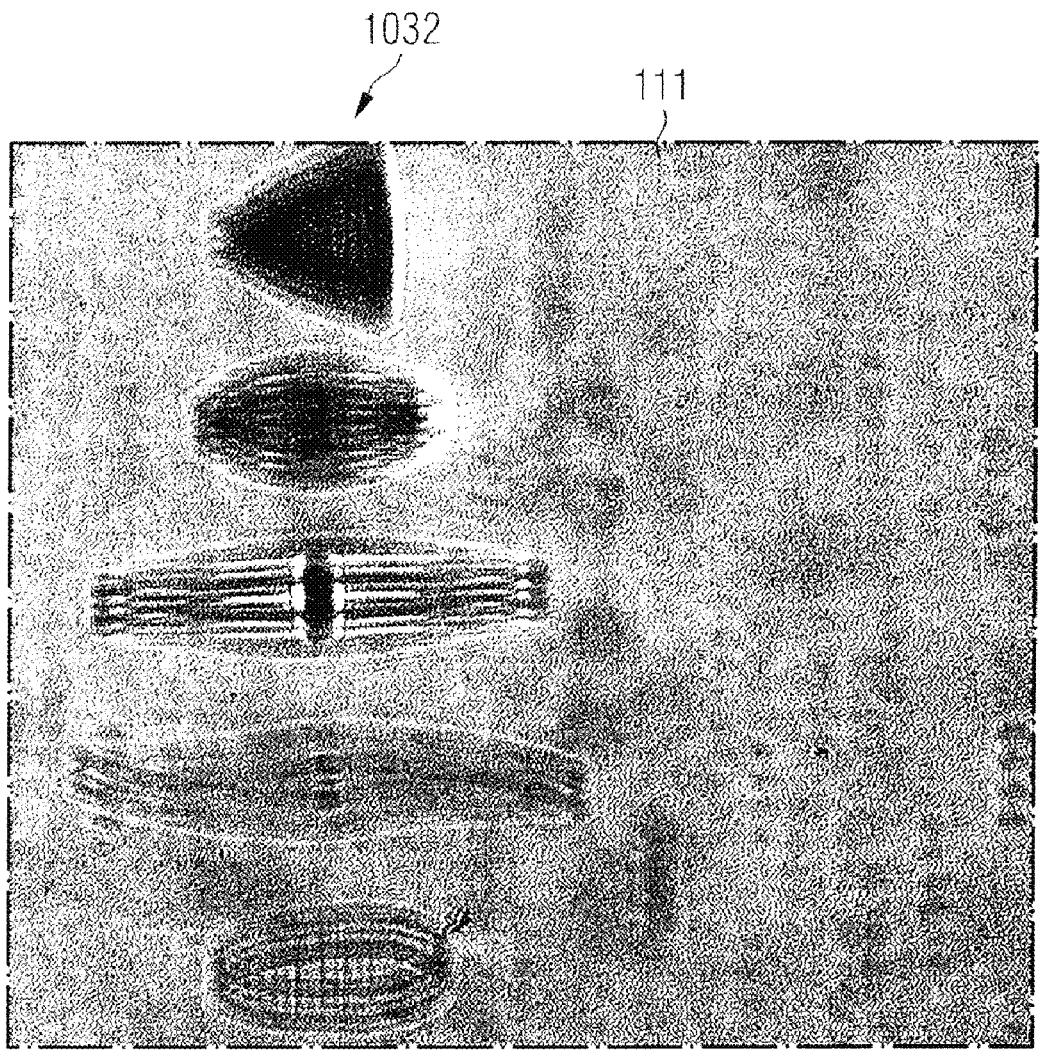
FIG. 9 shows measurement data of an image of the sample object under illumination by means of the pattern in accordance with the example from FIG. 8.
Figure 9:
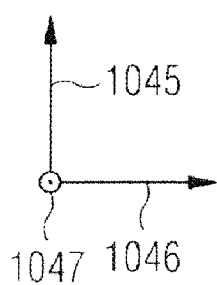

FIG. 9 shows measurement data for an image 111 of the sample object 1031. In particular, the image 111 includes the imaging 1032 of the sample object 1031 upon illumination by means of the pattern 1042 in accordance with the example in FIG. 8. It is evident from FIG. 9 that the imaging 1032 is arranged in a manner repeated multiply in the direction 1045 since a plurality of light sources 1041 are activated in accordance with the pattern 1042 along said direction 1045.

Figure 10:
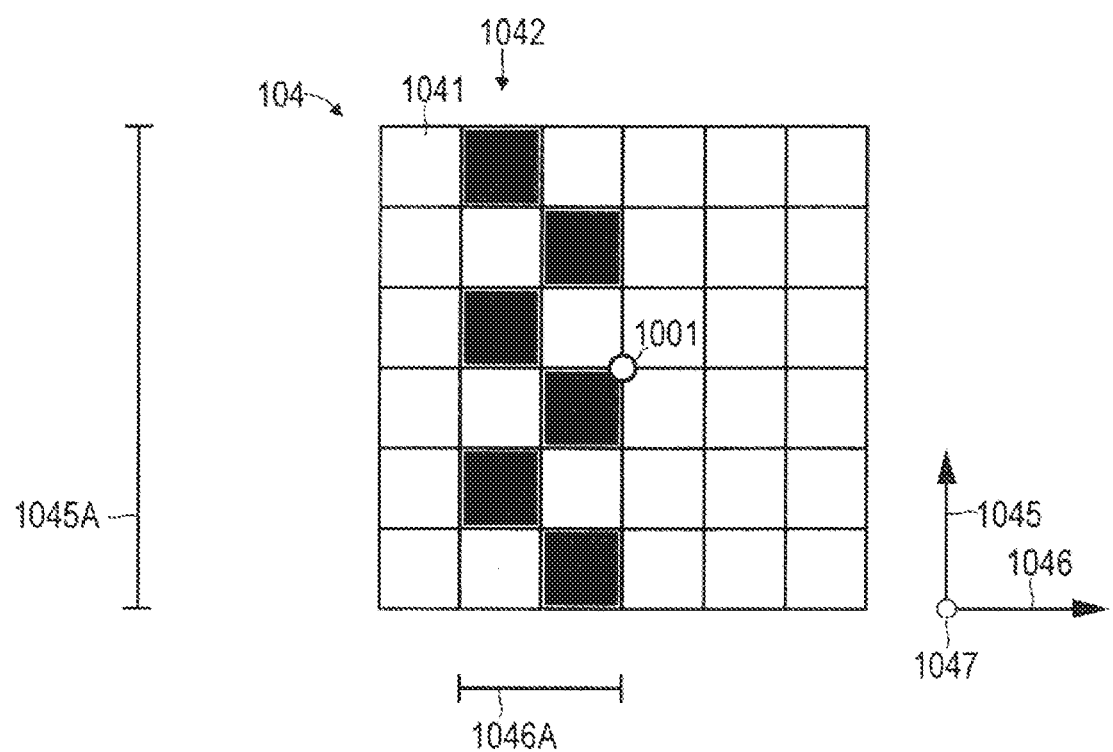
FIG. 10 schematically illustrates a pattern including a plurality of illumination directions in accordance with various examples.

FIG. 10 illustrates aspects in relation to the illumination module 104. In particular, FIG. 10 illustrates a multiplicity of light sources 1041 of the illumination module 104, which are activated in accordance with a further exemplary pattern 1042 for illuminating the sample object.

In FIG. 10, too, a thin pattern is used since the extent 1046A along the direction 1046 (two light sources) is not more than 40% of the extent 1045A along the direction 1045.

The pattern 1042 in accordance with the example in FIG. 10 has a two-dimensional extent both along the direction 1045 and along the direction 1046. Such a pattern having a two-dimensional extent could also be used in accordance with various examples in order to determine the arrangement of the sample object in relation to the focal plane.

Figure 11:
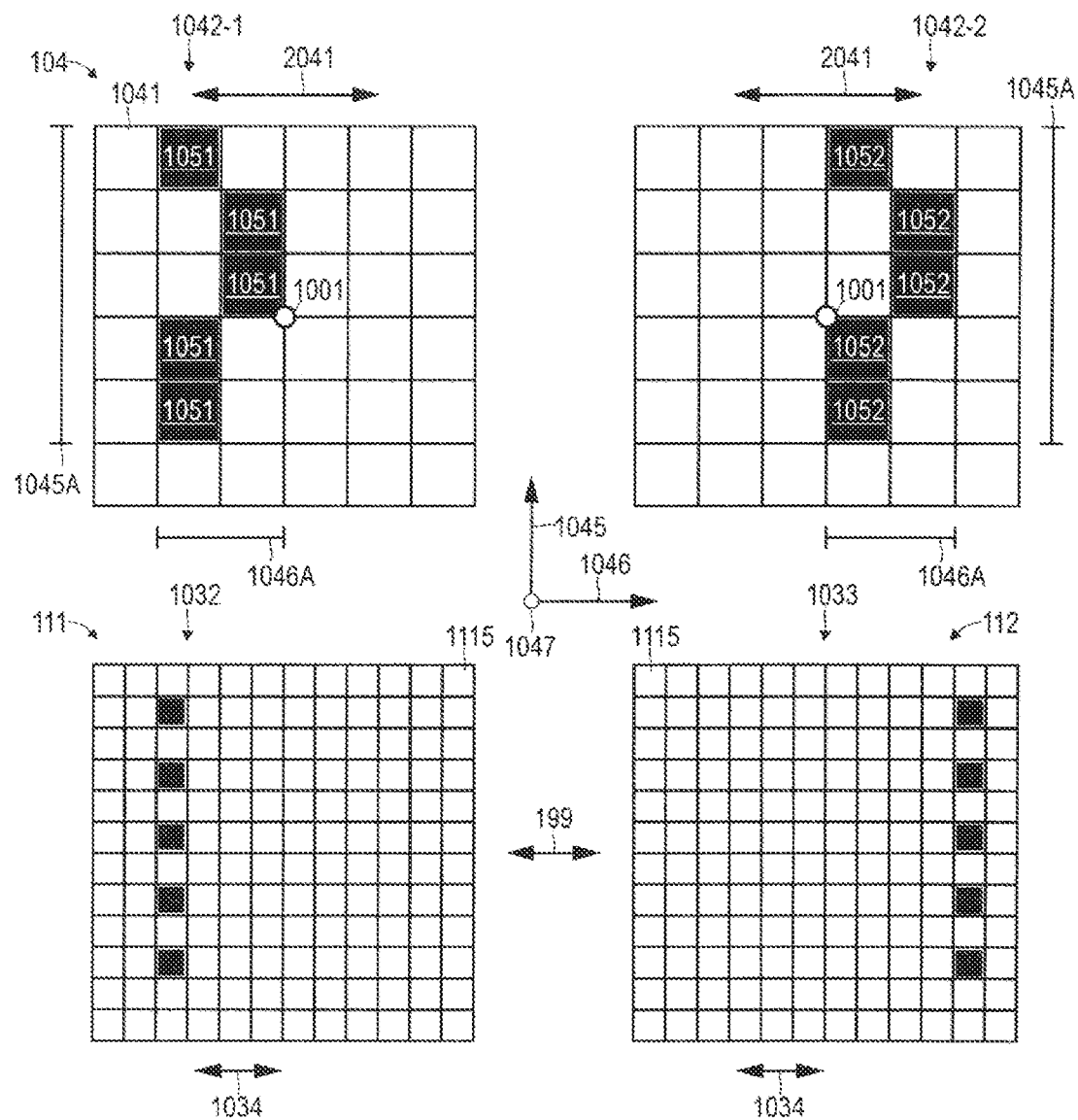
FIG. 11 schematically illustrates carrying out a correlation between data which, in accordance with various examples, are indicative of images of the sample object under illumination from different illumination directions.

FIG. 11 illustrates aspects in relation to comparing data which are indicative of the image 111 of the sample object 1031 under illumination from the illumination directions 1051 in accordance with a pattern 1042-1 with data which are indicative of the image 112 of the sample object 1031 under illumination from the illumination directions 1052 in accordance with a pattern 1042-2. By way of example, a correlation 199 could be used for comparing the images 111, 112.

In the example in FIG. 11, the patterns 1042-1, 1042-2 are applied sequentially in time domain, such that different images 111, 112 are obtained. However, it would also be possible for the two patterns 1042-1, 1042-2 to be used in parallel in time domain and for a single image to be obtained. This would result in an autocorrelation function having at least three maxima (at 0, −T, +T) for a defocused sample object. With knowledge of the direction of the defocusing—upstream or downstream of the focal plane—it is possible to determine the distance between the sample object and the focal plane. The direction of the defocusing could also be ascertained by means of incrementally changing the position of the sample object and once again determining the distance.

In the example in FIG. 11, a scenario is shown in which the pattern 1042-1 can be mapped onto the pattern 1042-2 by means of translation 2041. This means, in other words, that the patterns 1042-1, 1042-2 are identical, but are displaced relative to one another. By way of example, for each of the used light sources 1041 of the pattern 1042-1, the translation 2041 also corresponds to the distance 1040 with respect to a corresponding light source 1041 of the pattern 1042-2.

Figure 12:
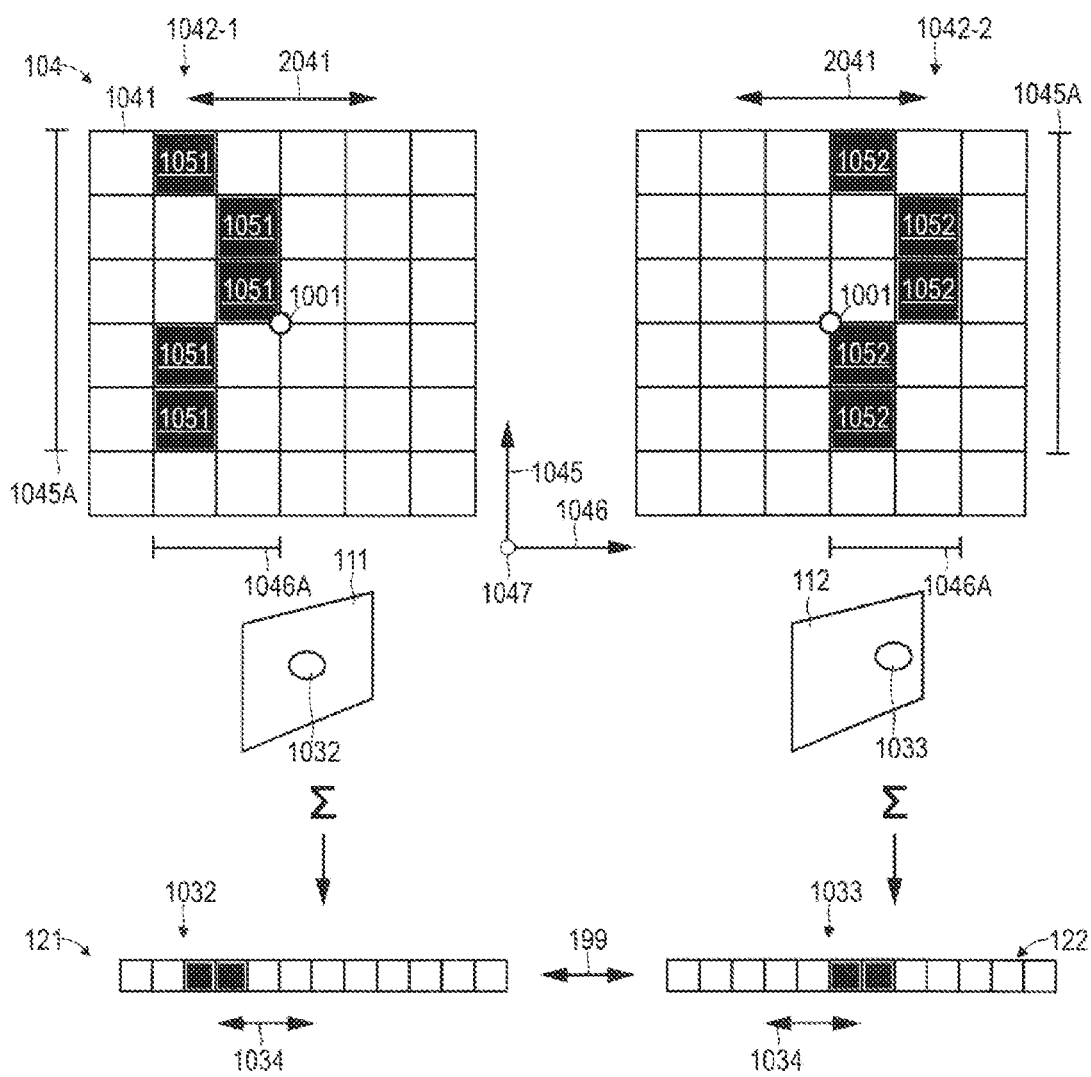
FIG. 12 schematically illustrates carrying out a correlation between data which, in accordance with various examples, are indicative of images of the sample object under illumination from different illumination directions.

In the example in FIG. 12, thin patterns 1042-1, 1042-2 are used. The extent 1046A parallel to the translation 2041 is only 40% of the extent 1045A along the direction 1045 perpendicular to the translation 2041. This enables a particularly precise evaluation.

In the example in FIG. 11, a scenario is illustrated, in particular, in which the patterns 1042-1, 1042-2 are arranged symmetrically in relation to the principal optical axis 1001. Alternatively, use could also be made of patterns arranged on the same side of the principal optical axis 1001, for example two line patterns at different distances from the principal optical axis 1001.

FIG. 11, at the bottom, illustrates the corresponding images 111, 112 of the sample object 1031 upon illumination in accordance with the pattern 1042-1 and upon illumination in accordance with the pattern 1042-2, respectively. The pixels 1115 of the images 111, 112 are also illustrated. In FIG. 11, those pixels 115 at which the respective imaging 1032, 1033 of the sample object 1031 is situated are filled as black.

It is evident from FIG. 11 that the imagings 1032, 1033 each have a periodicity along the direction 1045. This periodicity is caused on account of the use of the corresponding pattern 1042-1, 1042-2, which also has a periodicity along the direction 1045 on account of the use of a plurality of light sources 1041.

In addition, however, the distance 1034 is also observed. The distance 1034 is caused by the translation 2041. The distance 1034 can be ascertained by the cross-correlation 199 between the images 111, 112.

By way of example, if a two-dimensional cross-correlation is carried out along the directions 1045, 1046, maxima of the cross-correlation are observed in both directions 1045, 1046. In this case, the maxima of the cross-correlation along the direction 1045 are caused by the use of the patterns 1042-1, 1042-2; these maxima can be ignored in the evaluation for determining the distance 1034. Rather, the maxima of the cross-correlation along the direction 1046—i.e. the connecting lines 1040 of corresponding illumination directions—are taken into account in order to determine the distance 1034.

FIG. 12 illustrates aspects in relation to comparing data which are indicative of the image 111 of the sample object 1031 under illumination from the illumination directions 1051 in accordance with a pattern 1042-1 with data which are indicative of the image 112 of the sample object 1031 under illumination from the illumination directions 1052 in accordance with a pattern 1042-2. By way of example, a correlation 199 could be used for comparing the images 111, 112.

The example in FIG. 12 corresponds, in principle, to the example in FIG. 11. In the example in FIG. 12, the images 111, 112 are preconditioned, however, in order to obtain data 121, 122. The data 121, 122 are indicative of the images 111, 112.

In the example in FIG. 12, the data 121, 122 are determined on the basis of a combination of pixels 1115 of the images 111, 112 along the direction 1045—that is to say perpendicular to the translation 2041. As a result, the periodicity along the direction 1045 on account of the use of the patterns 1042-1, 1042-2 is eliminated from the data 121, 122 and a one-dimensional autocorrelation 199 can be carried out. The latter can be carried out particularly rapidly, such that real-time applications are promoted.

Figure 13:
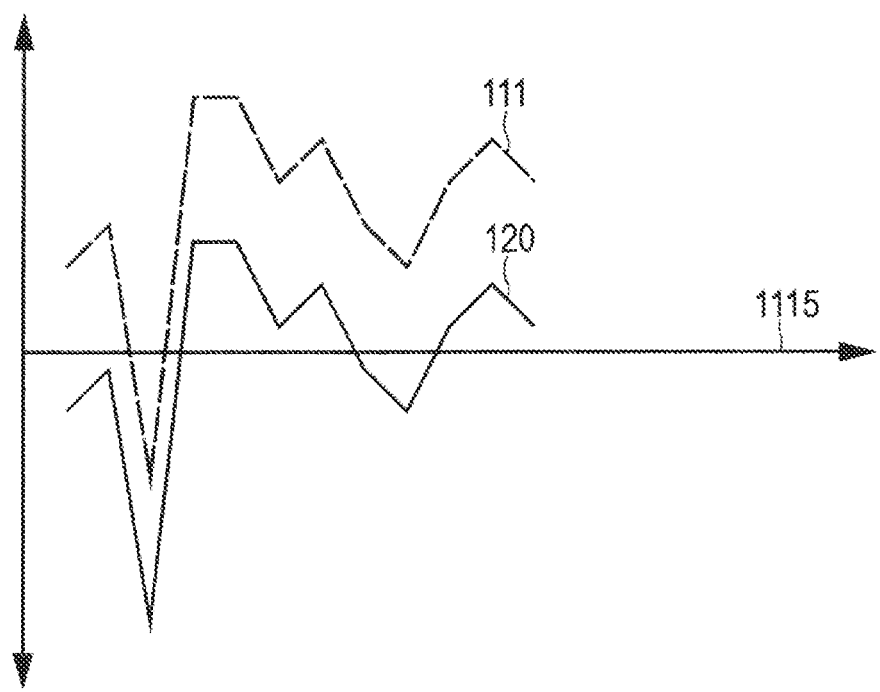
FIG. 13 schematically illustrates determining a contrast image as preconditioning before carrying out a correlation in accordance with various examples.
Figure 14:
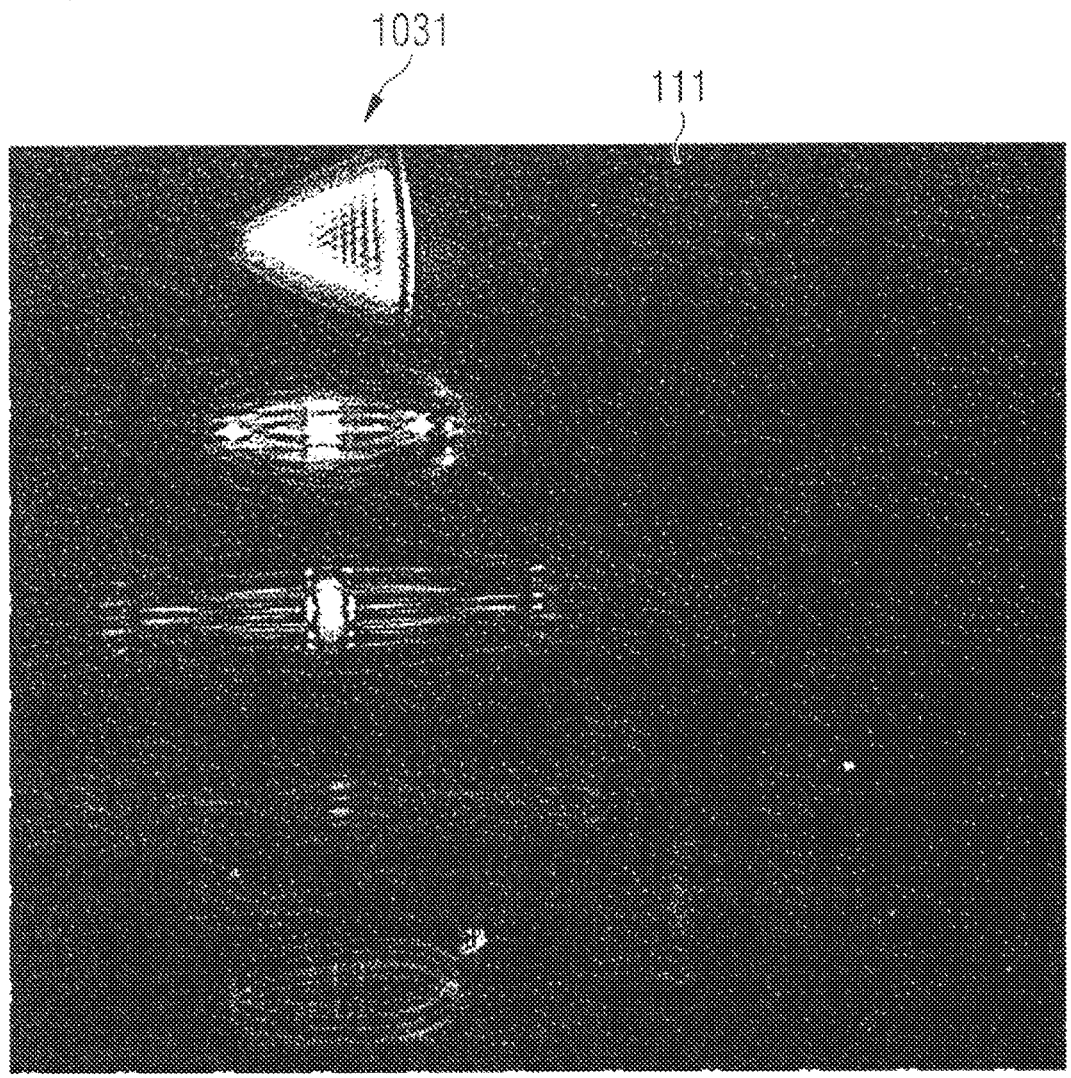
FIG. 14 shows measurement data of the contrast image for the image in accordance with the example from FIG. 9.
Figure 14:
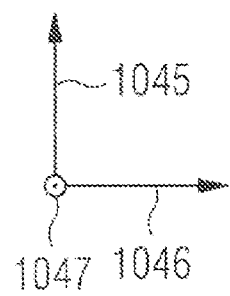

FIG. 13 illustrates aspects in relation to determining data 120 as a contrast image of an image 111. FIG. 13 illustrates the values of pixels 1115 of the image 111 using the dashed line. These values of the pixels 1115 have an offset relative to the zero point—or generally a reference value. By subtracting the average, said offset can be eliminated and the contrast image 120 is obtained, i.e. |I−<I>|. In this case, therefore, the average is subtracted from the values of the pixels and afterwards the absolute value is optionally formed as well (the absolute value formation is not illustrated in FIG. 13). FIG. 14 illustrates the contrast image 120 for the image 111 in accordance with the example from FIG. 9. On the basis of the contrast image 120, it is possible to determine the arrangement of the sample object 1031 with respect to the focal plane particularly accurately. Specifically, a typical bright-dark profile can occur, for example, during the oblique illumination of phase objects. This effect can be reduced when the contrast image 120 is taken into account. The contrast image 120 is helpful particularly in focus tracking applications.

Figure 15:
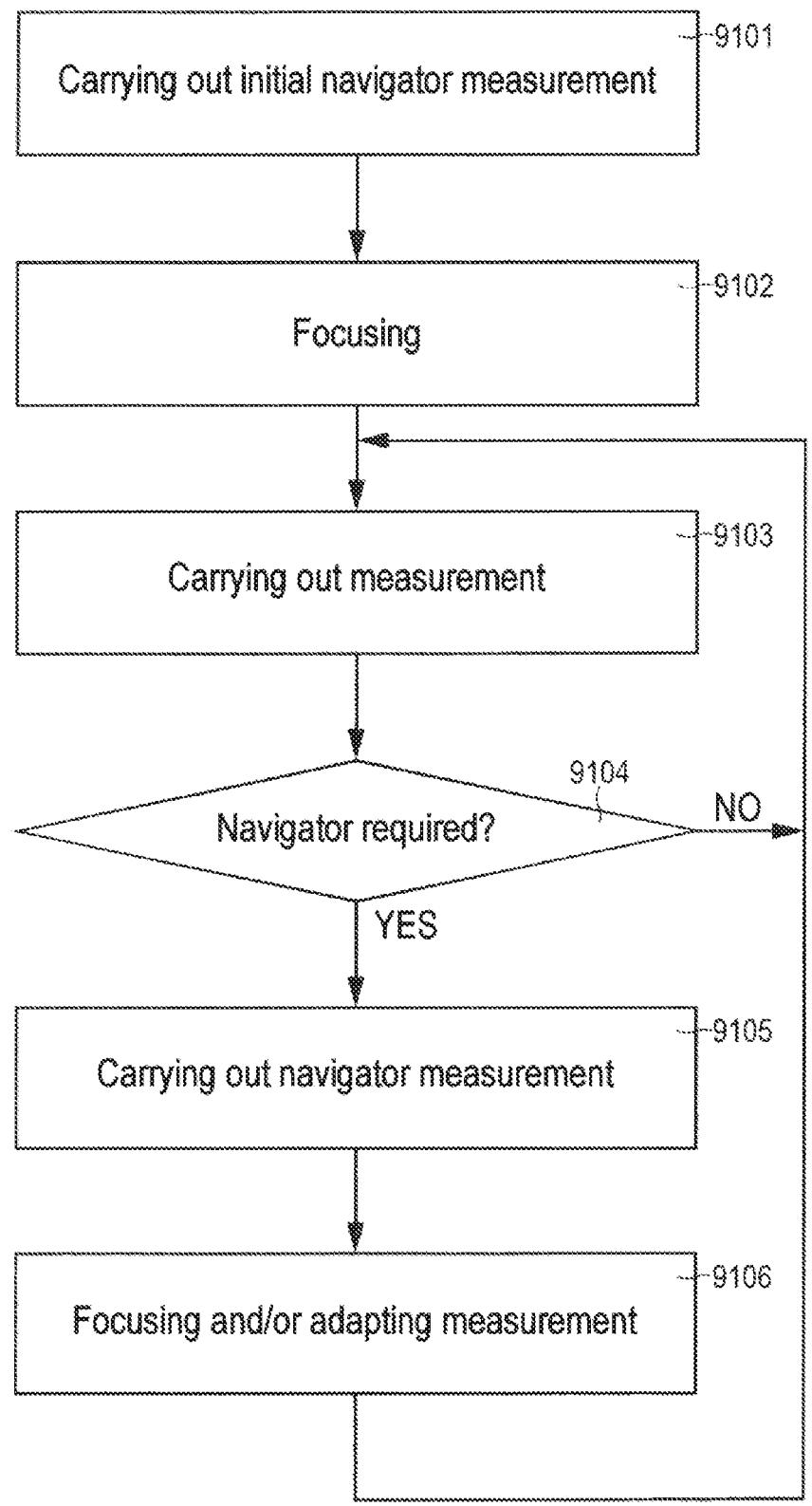
FIG. 15 is a flow diagram of one exemplary method.

FIG. 15 is a flow diagram of one exemplary method. The example in FIG. 15 illustrates how determining the arrangement of the sample object 1031 in relation to the focal plane 1035 can be combined with carrying out a long-term measurement. By way of example, the long-term measurement could concern fluorescence imaging or else the observation of a sample object 1031 through the eyepiece of a light microscope by a user. A further example is light sheet imaging.

Firstly, step 9101 involves carrying out an initial navigator measurement. The navigator measurement comprises illuminating the sample object 1031 from at least one first illumination direction 1051 and illuminating the sample object 1052 from at least one second illumination direction 1052. By way of example, carrying out the navigator measurement could comprise steps 9001-9004 in accordance with the method from FIG. 2.

Firstly, the initial navigator measurement is carried out in step 9001 without a priori knowledge about the arrangement of the sample object 1031 in relation to the focal plane. For example, the initial navigator measurement could be carried out automatically in step 9001 after the user has positioned the sample object 1031 for the first time on the sample holder 103.

The absence of a priori knowledge about the arrangement of the sample object 1031 can be taken into account when selecting the illumination directions 1051, 1052 used in step 9101. In particular, it could be taken into account that there is a significant probability of the sample object 1031 being at a considerable distance from the focal plane 1035. Therefore, such illumination directions 1051, 1052 which are not at a particularly large distance 1040 from one another could be used in step 9101. This is because otherwise the case might occur that at least one of the imagings 1033, 1032 can no longer be captured through the aperture of the detector 102.

The initial focusing of the sample object 1031 can be carried out particularly rapidly in accordance with the method described in FIG. 15. A field-dependent determination of the focus position is possible.

Afterward, on the basis of the ascertained distance 1034 between the imagings 1032, 1033, focusing is carried out in step 9102.

Step 9103 then involves starting the long-term measurement, for instance a fluorescence measurement. While the long-term measurement is carried out by means of the optical device 100 in step 9103, in step 9104 a check is made to establish whether a navigator measurement is required. By way of example, in step 9104 a check could be made to establish whether a specific timer has elapsed, wherein the timer can trigger e.g. the periodic or repeated carrying out of the navigator measurement.

If it is ascertained in step 9104 that no navigator measurement is required, carrying out the long-term measurement is continued in step 9103.

Otherwise, a navigator measurement is carried out in a manner embedded into the long-term measurement in step 9105. This could be done in various ways.

By way of example, the embedding could be carried out by means of time division multiplexing, that is to say that carrying out the long-term measurement could be interrupted while carrying out the navigator measurement and then be resumed again. One and the same detector 102 can then be used for the long-term measurement and the navigator measurement. By way of example, the spectral range in which said detector 102 is sensitive could be switched over in each case when a switchover is carried out between the long-term measurement and the navigator measurement.

In another example, the embedding could be carried out by means of frequency division multiplexing, that is to say that carrying out the long-term measurement could be continued while carrying out the navigator measurement, wherein an interaction between carrying out the long-term measurement and carrying out the navigator measurement could be reduced by the use of light having different wavelengths. Thus, with regard to fluorescence measurements, for example, the light loading of the sample object could be reduced; so-called bleaching of the sample object can be avoided. Spectral ranges of the light that are otherwise unused can be used for the navigator measurement. By way of example, infrared light could be used for carrying out the navigator measurement. For this purpose, a dedicated detector 102 can be provided, which is different than the detector used for the long-term measurement. In one example, a camera could be used as detector 102, which is mounted on a specific region of the sensor of the fluorescence camera.

When carrying out the embedded navigator measurement in step 9105, a check can be made to establish whether a priori knowledge about the arrangement of the sample object in relation to the focal plane is present. Since, when carrying out the navigator measurement in step 9105, typically the time that has elapsed since carrying out the initial navigator measurement in step 9101 has not been particularly long, this check can reveal that a priori knowledge about the arrangement of the sample object 1031 in relation to the focal plane 1035 is present. This can mean, for example, that a comparatively resilient estimation of the distance of the sample object 1031 in relation to the focal plane 1035 is already present.

It is then possible in turn for the different illumination directions 1051, 1052 that are spaced apart from one another and are used in step 9105 to be selected on the basis of the checking of whether a priori knowledge is present. If the a priori knowledge is present, the illumination directions 1051, 1052 can be selected with a comparatively large distance 1040 with respect to one another. Specifically, it can be assumed in such a case that the sample object 1031 is arranged comparatively near the focal plane 1035, such that the distance 1034 between the imagings 1032, 1033 is dimensioned to be comparatively small, even if a large distance 1040 between the illumination directions 1051, 1052 is chosen. As a result of the comparatively large dimensioning of the distance 1040, what can be achieved is that the distance between the sample object 1031 and the focal plane 1035 can be determined particularly accurately.

Afterward, in step 9106, for example, focusing of the sample object 1031 is carried out, that is to say that the ascertained distance between the sample object 1031 and the focal plane 1035 is minimized by adjusting the sample holder 103.

Alternatively or additionally, in step 9106, a different parameter of the long-term measurement could also be adapted, e.g. the position and/or the number of layers used if a layer-resolved long-term measurement is used.

It is evident from FIG. 15 that the focusing in step 9106 is carried out repeatedly. This means that, in the example in FIG. 15, it is possible to implement a focus tracking application which continuously ensures that the sample object 1031 is arranged in the focal plane 1035. By way of example, it is thereby possible also to track the Z-position of the sample object during the long-term measurement. This makes it possible to reduce a light loading to which the sample object is subjected.

In some examples, it would be possible for such a focus tracking application to be implemented by way of a control loop. In this case, the motorized sample holder 103 could be driven by means of the control loop, wherein the control loop takes account of the arrangement of the sample object in relation to the focal plane as a controlled variable. The control loop could endeavor to minimize the distance between the sample object and the focal plane. In association with the control loop it would then be possible for the at least one first illumination direction and the at least one second illumination direction which are used for carrying out the navigator measurement in step 9105 to be selected from a multiplicity of candidate illumination directions on the basis of a control deviation of the control loop. In the case of a large (small) control deviation, by way of example, such illumination directions which are at a small (large) distance 1040 with respect to one another could be selected.

In another implementation of the control loop, by way of example, the movement of the imaging of the sample object upon a displacement of the Z-position could be taken into account. The Z-position could then be changed until the imaging of the sample object no longer moves or a contrast figure acquires an extreme value.

Figure 16:
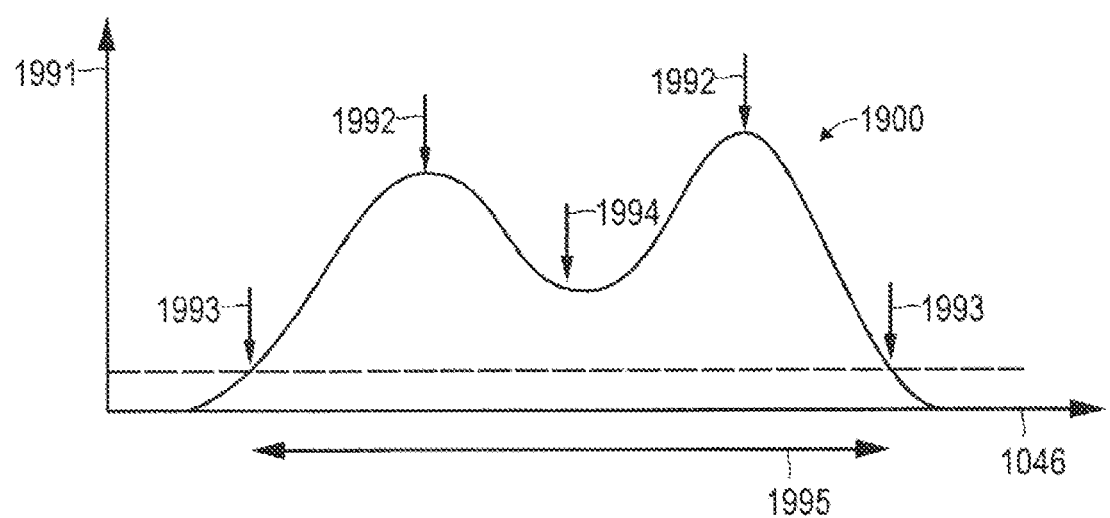
FIG. 16 schematically illustrates evaluating a maximum of the correlation in accordance with various examples.

FIG. 16 illustrates aspects in relation to a maximum 1900 of the correlation 199. FIG. 16 illustrates the value 1991 of the correlation for different distances along the direction 1046.

FIG. 16 illustrates an example in which the maximum 1900 has two peak values 1992. By way of example, the two peak values 1992 could occur on account of the presence of a plurality of sample objects or sample objects that are extensive in the Z-direction 1047. By way of example, it could therefore be worthwhile, during the analysis of the correlation 199, to determine the width 1995 of the maximum 1900 for instance by ascertaining the marginal points 1993. The position of the maximum 1900 could then be defined as the midpoint 1994 between the marginal points 1993. Alternatively, the position of the maximum 1900 could also be determined by that peak value 1992 having the highest value 1991 of the correlation.

The width 1995 of the maximum 1900 could for example also be taken into account when determining the arrangement of the sample object in relation to the focal plane. Specifically, by way of example, the width 1995 of the maximum 1900 may be indicative of the extent of the sample object along the Z-direction.

Figure 17:
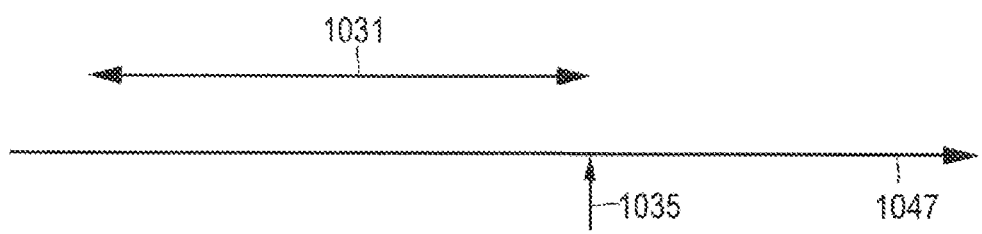
FIG. 17 schematically illustrates the extent of a sample object arranged in a defocused manner in accordance with various examples.
Figure 18:
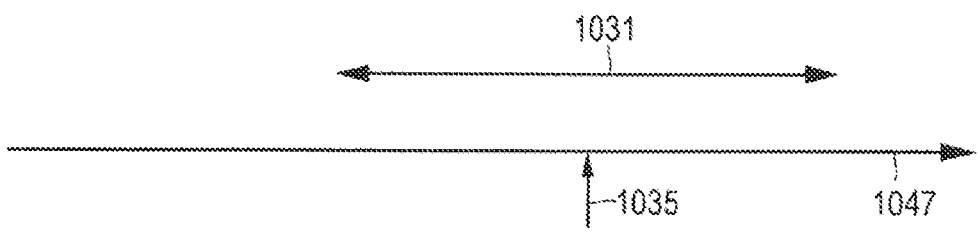
FIG. 18 schematically illustrates the extent of a sample object arranged in a focused manner in accordance with various examples.
Figure 19:
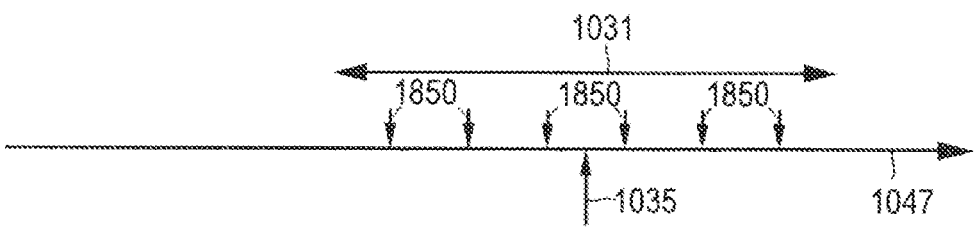
FIG. 19 schematically illustrates the position and arrangement of a plurality of layers of a layer-resolved measurement for a sample object arranged in a focused manner in accordance with various examples.

FIGS. 17-19 illustrate examples with regard to applications which may be made possible by determining the arrangement of the sample object in relation to the focal plane.

FIG. 17 here shows a state in which the sample object 1031 has a certain extent along the Z-direction 1047. The sample object 1031 is arranged in a defocused manner because it is arranged outside the focal plane 1035. By way of example, it would be possible to determine the extent of the sample object 1031 along the Z-direction 1047 on the basis of the width 1995 of the maximum 1900 of the correlation 199.

FIG. 18 illustrates a state in which the sample object 1031 is arranged in a focused manner. By way of example, the motorized sample holder 103 could be driven proceeding from the state in FIG. 17 in order to displace the sample object 1031 into the state in accordance with FIG. 18.

FIG. 19 illustrates the selection of layers 1850 of a layer stack on the basis of the determined extent of the sample object 1031 perpendicular to the focal plane 1035, i.e. along the Z-direction 1047. The position and/or the number of the layers 1850 are/is selected for example such that the latter are at a uniform distance from one another and cover the entire extent of the sample object 1031. Then, for example in the context of the long-term measurement from step 9103 of the method in accordance with FIG. 15, an imaging could be carried out for each of the layers 1850. By way of example, a light sheet fluorescence imaging could be carried out for the layers 1850.

By means of such techniques, it may be possible that, even over a comparatively long time period of minutes or hours or even days during which the corresponding long-term measurement is carried out, it can be ensured that imaging is carried out for the entire extent of the sample object 1031. In particular, changes in the shape of the sample object 1031 or other drifts over time can be taken into account. Moreover, it is thereby possible to achieve a data reduction, for example, because in such a case it may be unnecessary preventively to provide a large number of layers 1850 that also cover a possible movement or change in volume of the sample object 1031. Moreover, the time duration for acquiring measurement data can be reduced because the number of layers 1850 required can be limited. Moreover, the light exposure of the sample object 1031 can be reduced because the number of layers 1850 required is limited and only that part which must also actually be illuminated is illuminated.

Besides the application illustrated in FIG. 19 concerning the selection of layers 1850 for imaging, other applications may also benefit from determining the extent of the sample object 1031 along the Z-direction. By way of example, it would be possible for a user interface of the optical device 100 to be driven in a suitable manner, thereby limiting the positioning range of the sample holder 103 on the basis of the extent of the sample object 1031. This could mean, in other words, that the user can carry out focusing within the extent 1031 and, if appropriate, also within a corresponding tolerance range; however, a coarse defocusing can be avoided by virtue of the corresponding limitation.

A further application that can benefit from determining the extent of the sample object 1031 along the Z-direction 1047 would be, for example, the determination of the volume of the sample object. By way of example, the volume of the sample object 1031 could be determined from the extent parallel to the Z-direction 1047 and from the extent parallel to the lateral directions 1045, 1046. The corresponding information may also be of interest in association with long-term measurements. By way of example, it would be possible to determine parameters for three-dimensional imaging techniques fully automatically in this way, and to adapt the size of the recording depending on the extent in the Z-direction 1047 also along the lateral directions 1045, 1046. Corresponding information could also be stored as metadata together with image data.

To summarize, a description has been given above of techniques by means of which an arrangement of a sample object in relation to a focal plane of an optical device can be determined particularly accurately.

These techniques enable various applications, such as, for example, ascertaining the focus position of a greatly defocused sample object. For this purpose, by way of example, illumination directions which are not at a particularly large distance with respect to one another can be used for illuminating the sample object; what is achieved as a result is that the corresponding imagings can still be captured by the aperture of the detector.

A further application made possible by these techniques concerns the retention or slight refocusing of a fundamentally focused sample object. This corresponds to a focus tracking application, sometimes also referred to as focus retention method. In contrast to reference implementations of focus tracking applications, a particularly simple hardware architecture can be achieved. In particular, it may be unnecessary to couple a beam splitter plate into the beam path. In other words, additional oblique plates are not required, which may be worthwhile in particular in association with fluorescence imaging, in order to increase the light efficiency. In particular, the techniques described herein can thus be integrated into existing optical devices in a simple manner.

By way of example, it would be possible for the distance between the sample object and the focal plane to be determined. Said distance could be stored for example as metadata together with corresponding images. Such techniques are sometimes referred to as quantitative imaging. The metadata could be used for later correction.

Yet another application made possible by these techniques concerns ascertaining the extent of the sample object for the automated setting of a plurality of layers of a layer stack during a layer-resolved measurement. The layer stack can be dynamically adapted if the sample grows or the shape of the sample changes.

Some of the techniques described herein are based on the use of patterns comprising a plurality of illumination directions. In this case, various patterns can be used, for example one-dimensional patterns. One-dimensional patterns can be implemented for example by a plurality of light sources arranged on a line. Optionally, the patterns used could be arranged symmetrically with respect to the principal optical axis of the optical device. In particular, it may be possible that the patterns used can be mapped onto one another by means of translation, that is to say that the patterns used are identical apart from a displacement. Corresponding imagings of the sample object can then be compared in particular along the direction of the translation. In particular, it is possible to determine that displacement which best describes the structure to be examined. A lateral duplication by the patterns in the direction perpendicular to the translation can be ignored in this evaluation or be utilized for increasing the signal-to-noise ratio.

It goes without saying that the features of the embodiments and aspects of the invention described above can be combined with one another. In particular, the features can be used not only in the combinations described but also in other combinations or on their own without departing from the scope of the invention.

By way of example, a description has been given above of various techniques in which an autocorrelation is carried out on the basis of a single image in order to determine the arrangement of the sample object. Further techniques have been described in which a cross-correlation is carried out on the basis of two images in order to determine the arrangement of the sample object. It is possible to combine such techniques. By way of example, illumination directions could be arranged in accordance with a rectangle, wherein the long sides of the rectangle respectively form a pattern (by way of example, the long sides of the rectangle could be oriented along the direction 1045 in the FIGs). These patterns could have a periodicity of the light sources used along the long sides. It would be possible for the periodicity to be strict, that is to say for all distances between adjacent light sources along the long side to be identical and for the periodicity thus not to have a plurality of spatial frequency contributions. It would also be possible for line patterns to be used; this means that adjacent light sources of the same pattern do not have an offset along the direction of the short sides of the rectangle, but rather only an offset along the direction of the long sides of the rectangle. Both of the patterns used could be identical. In a first image the illumination is carried out in accordance with the first pattern, and in a second image the illumination is carried out in accordance with the second pattern. The two patterns can be identical and can be converted into one another by means of translation along the short side of the rectangle. The distance between the sample object and the focal plane and the sign of the distance can then be determined from the one-dimensional cross-correlation of the two images along the short side of the rectangle. It is possible at the same time to carry out a one-dimensional autocorrelation in the first image and/or a one-dimensional autocorrelation in the second image, wherein these autocorrelations are oriented perpendicular to the translation along the long sides of the rectangle. On account of the periodicity, a particularly accurate determination of the distance between the sample object and the focal plane can be obtained, wherein the sign of the distance can be obtained from the cross-correlation.

By way of example, a description has been given above of various techniques in which the digital postprocessing comprises a correlation between one or more images which include an imaging of the sample object from different illumination directions. In general, however, it would also be possible for the digital postprocessing not to use a correlation, but rather some other technique for comparing imagings of the sample object from different illumination directions. One example would be landmark recognition, for example, wherein, in different imagings of the sample object that correspond to different illumination directions, in each case a characteristic feature of the sample object is identified and a distance between the landmarks defined in this way is then ascertained. A further example comprises iteratively displacing a first image, which corresponds to a first illumination direction, relative to a second image, which corresponds to a second illumination direction. A combination, for example an addition, of the displaced first image and the second image could then be carried out for each displacement. A sharpness figure resulting from an edge steepness or the like, for example, could subsequently be calculated along the direction of the displacement. That displacement for which an optimum sharpness figure is obtained could then be selected. This selected displacement could then in turn be used for determining the position of the sample object in relation to the focal plane. Depending on the sample object, such alternative techniques to correlation may also have a high accuracy. Therefore, in various examples, it may be possible to implement for example the autofocus application or the light sheet microscopy application, or further applications which have recourse to the arrangement of the sample object in relation to the focal plane, without the correlation.

The invention claimed is:

1. A method for determining an arrangement of a sample object in an optical device, comprising:
    illuminating the sample object from at least one first illumination direction and capturing an image of the sample object under illumination from the at least one first illumination direction,
    illuminating the sample object from at least one second illumination direction and capturing an image of the sample object under illumination from the at least one second illumination direction,
    carrying out a correlation between data which are indicative of at least one section of the image of the sample object under illumination from the at least one first illumination direction and data which are indicative of at least one section of the image of the sample object under illumination from the at least one second illumination direction,
    determining a distance between the image of the sample object under illumination from the at least one first illumination direction and the image of the sample object under illumination from the at least one second illumination direction, and
    calculating the arrangement of the sample object in relation to a focal plane of the optical device based on the correlation and based on a first angle associated with the at least one first illumination direction and a second angle associated with the at least one second illumination direction.

2. The method of claim 1,
    wherein said illuminating the sample object from the at least one first illumination direction and said illuminating the sample object from the at least one second illumination direction are carried out in parallel in time domain, and wherein the correlation comprises an autocorrelation of data which are indicative of at least one section of an image of the sample object under joint illumination from the first illumination direction and the second illumination direction.

3. The method of claim 1, wherein said illuminating the sample object from the at least one first illumination direction and said illuminating the sample object from the at least one second illumination direction are carried out sequentially in time domain, and wherein the correlation comprises a cross-correlation between first data, which are indicative of at least one section of a first image of the sample object under illumination from the first illumination direction, and second data, which are indicative of at least one section of a second image of the sample object under illumination from the second illumination direction.

4. The method of claim 1, wherein the sample object is illuminated in parallel in time domain with a first plurality of illumination directions, wherein the first plurality of illumination directions is arranged in a first pattern and comprises the first illumination direction, wherein the sample object is illuminated in parallel in time domain with a second plurality of illumination directions, wherein the second plurality of illumination directions is arranged in a second pattern and comprises the second illumination direction, and wherein the first pattern is configured to be mapped onto the second pattern by a translation.

5. The method of claim 4, wherein the first pattern has an extent perpendicular to a direction of the translation which has a magnitude at least double a magnitude of the extent of the first pattern parallel to the direction of the translation.

6. The method of claim 4, further comprising:

determining the respective data which are indicative of at least one section of a corresponding image based on a combination of pixels of the corresponding image along a lateral direction perpendicular to the translation.

7. The method of claim 1, furthermore comprising:

determining the data based on a contrast image of a corresponding image.

8. The method of claim 1, wherein the correlation comprises a one-dimensional correlation along a connecting line between the at least one first illumination direction and the at least one second illumination direction.

9. The method of claim 1, further comprising:

carrying out a long-term measurement by the optical device, wherein illuminating the sample object from the at least one first illumination direction and illuminating the sample object from the at least one second illumination direction, carrying out the correlation and determining the arrangement of the sample object are performed repeatedly as a navigator measurement embedded into the long-term measurement by frequency division multiplexing and/or time division multiplexing.

10. The method of claim 1, further comprising:

determining whether a priori knowledge of the arrangement of the sample object in relation to the focal plane is present, and selecting the at least one first illumination direction and the at least second illumination direction from a plurality of candidate illumination directions based on the determining whether a priori knowledge is present.

11. The method of claim 10, wherein, if a priori knowledge is not present, the first illumination direction and the second illumination direction are selected at a first distance with respect to one another, wherein, if a priori knowledge is present, the first illumination direction and the second illumination direction are selected at a second distance with respect to one another, and wherein the first distance is less than the second distance.

12. The method of claim 10, wherein the a priori knowledge is present in a context of a focus tracking application.

13. The method of claim 1, further comprising:

driving a motorized sample holder by a control loop which takes account of the arrangement of the sample object in relation to the focal plane as a controlled variable, and selecting the at least one first illumination direction and the at least one second illumination direction from a plurality of candidate illumination directions based on a control deviation of the control loop.

14. The method of claim 1, further comprising:

determining an extent of the sample object perpendicular to the focal plane based on carrying out the correlation, carrying out a layer-resolved measurement of a position of the sample object for a plurality of layers of the sample object by the optical device, and determining the position and/or number of the layers based on the extent of the sample object perpendicular to the focal plane that has been determined.

15. The method of claim 1, further comprising:

determining an extent of the sample object perpendicular to the focal plane based on the carrying out the correlation, and driving a user interface of the optical device in order to limit a positioning range of a sample holder of the optical device to the extent that has been determined.

16. The method of claim 1, further comprising:

determining an extent of the sample object perpendicular to the focal plane based on the carrying out the correlation, determining an extent of the sample object parallel to the focal plane, and determining a volume of the sample object to the extent of the sample object parallel and perpendicular to the focal plane.

17. The method of claim 1, further comprising:

determining a width of a maximum of the correlation, wherein the arrangement of the sample object in relation to the focal plane is determined based on the width of the maximum of the correlation.

18. The method of claim 1, further comprising:

based on a priori knowledge of the position of the sample object in relation to the focal plane, defocusing the sample object before illuminating the sample object from the at least one first illumination direction and before illuminating the sample object from the at least one second illumination direction.

19. An optical device, comprising:
   at least one computing unit,
   an illumination module comprising a plurality of light sources, which define a plurality of illumination directions, and
   a sample holder configured to fix a sample object,
   wherein the at least one computing unit is configured to drive the illumination module for illuminating the sample object from at least one first illumination direction to capture an image of the sample object under illumination from the at least one first illumination direction and to drive the illumination module for illuminating the sample object from at least one second illumination direction to capture an image of the sample object under illumination from the at least one second illumination direction, and
   wherein the at least one computing unit is further configured to correlate a correlation between data which are indicative of at least one section of the image of the sample object under illumination from the at least one first illumination direction and data which are indicative of at least one section of the image of the sample object under illumination from the at least one second illumination direction,
   wherein the at least one computing unit is further configured to determine a distance between the image of the sample object under illumination from the at least one first illumination direction and the image of the sample object under illumination from the at least one second illumination direction,
   wherein the at least one computing unit is furthermore configured to calculate an arrangement of the sample object in relation to a focal plane of the optical device based on the correlation and based on a first angle associated with the at least one first illumination direction and a second angle associated with the at least one second illumination direction.

* * * * *

UNITED STATES PATENT AND TRADEMARK OFFICE
CERTIFICATE OF CORRECTION

PATENT NO. : 10,921,573 B2
APPLICATION NO. : 16/465016
DATED : February 16, 2021
INVENTOR(S) : Stoppe et al.

Page 1 of 1

It is certified that error appears in the above-identified patent and that said Letters Patent is hereby corrected as shown below:

On the Title Page

(30) Foreign Application Priority Data: Please correct "10 2016 123 154" to read
-- 10 2016 123 154.1 --

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*